United States Patent
Kim et al.

(10) Patent No.: US 12,304,074 B2
(45) Date of Patent: May 20, 2025

(54) ROBOT CARRIAGE TRAY TABLE

(71) Applicant: Dexterity, Inc., Redwood City, CA (US)

(72) Inventors: Justin Sunjoon Kim, Cupertino, CA (US); Andrew Lovett, Burlingame, CA (US); Alberto Leyva Arvayo, Palo Alto, CA (US); Shitij Kumar, Redwood City, CA (US); Cyril Nader, Palo Alto, CA (US); Yuan Gao, Mountain View, CA (US)

(73) Assignee: Dexterity, Inc., Redwood City, CA (US)

( * ) Notice: Subject to any disclaimer, the term of this patent is extended or adjusted under 35 U.S.C. 154(b) by 293 days.

(21) Appl. No.: 17/960,544

(22) Filed: Oct. 5, 2022

(65) Prior Publication Data

US 2023/0109294 A1 Apr. 6, 2023

Related U.S. Application Data

(60) Provisional application No. 63/253,049, filed on Oct. 6, 2021.

(51) Int. Cl.
| | |
|---|---|
| *B25J 9/16* | (2006.01) |
| *B25J 5/02* | (2006.01) |
| *B25J 9/00* | (2006.01) |
| *B25J 13/06* | (2006.01) |
| *B25J 13/08* | (2006.01) |
| *B25J 19/04* | (2006.01) |

(52) U.S. Cl.
CPC ............. *B25J 9/163* (2013.01); *B25J 5/02* (2013.01); *B25J 9/0084* (2013.01); *B25J 9/0096* (2013.01); *B25J 9/1664* (2013.01); *B25J 9/1697* (2013.01); *B25J 13/06* (2013.01); *B25J 13/089* (2013.01); *B25J 19/04* (2013.01)

(58) Field of Classification Search
CPC . B25J 5/02; B25J 9/0084; B25J 9/0096; B25J 9/163; B25J 9/1664; B25J 9/1697; B25J 13/06; B25J 13/089; B25J 19/04
See application file for complete search history.

(56) References Cited

U.S. PATENT DOCUMENTS

| | | |
|---|---|---|
| 6,415,204 B1 | 7/2002 | Hirabayashi |
| 8,327,531 B2 | 12/2012 | Ono |
| 12,064,886 B1 * | 8/2024 | Terhuja ................ B25J 9/1684 |

(Continued)

FOREIGN PATENT DOCUMENTS

| | | |
|---|---|---|
| CN | 103008263 | 10/2014 |
| CN | 210500352 | 5/2020 |
| JP | 3336068 | 10/2002 |

*Primary Examiner* — Dale Moyer
(74) *Attorney, Agent, or Firm* — Van Pelt, Yi & James LLP

(57) ABSTRACT

A task table for use in a robotic system comprising a robot mounted on a carriage configured to move the robot along a path is disclosed. The task table includes a substantially horizontal table surface, and one or more mounting arms to which the table surface is affixed at a first distal end and comprising, at a second distal end opposite the first distal end, one or more mounting structures, the one or more mounting arms having a length that allows the table surface to be mounted to the robot or the carriage at a distance from a base of the robot that enables the robot to reach a plurality of locations on the table surface each with a desired pose.

5 Claims, 23 Drawing Sheets

(56) References Cited

U.S. PATENT DOCUMENTS

| | | | |
|---|---|---|---|
| 2015/0032252 A1 | 1/2015 | Galluzzo | |
| 2018/0127219 A1* | 5/2018 | Wagner | G05B 19/4189 |
| 2018/0333749 A1* | 11/2018 | Wagner | B07C 1/04 |
| 2020/0269429 A1* | 8/2020 | Chavez | B25J 15/0616 |
| 2021/0097709 A1* | 4/2021 | Edwards | H04N 5/38 |
| 2021/0122043 A1 | 4/2021 | Menon | |
| 2021/0122046 A1 | 4/2021 | Sun | |
| 2021/0154839 A1 | 5/2021 | Diankov | |
| 2023/0052515 A1* | 2/2023 | Kanunikov | B25J 19/023 |
| 2023/0399136 A1* | 12/2023 | Budu | B25J 9/0084 |
| 2024/0208732 A1* | 6/2024 | Wagner | B07C 5/00 |

* cited by examiner

ROBOT CARRIAGE TRAY TABLE

CROSS REFERENCE TO OTHER APPLICATIONS

This application claims priority to U.S. Provisional Patent Application No. 63/253,049 entitled ROBOT CARRIAGE TRAY TABLE filed Oct. 6, 2021, which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
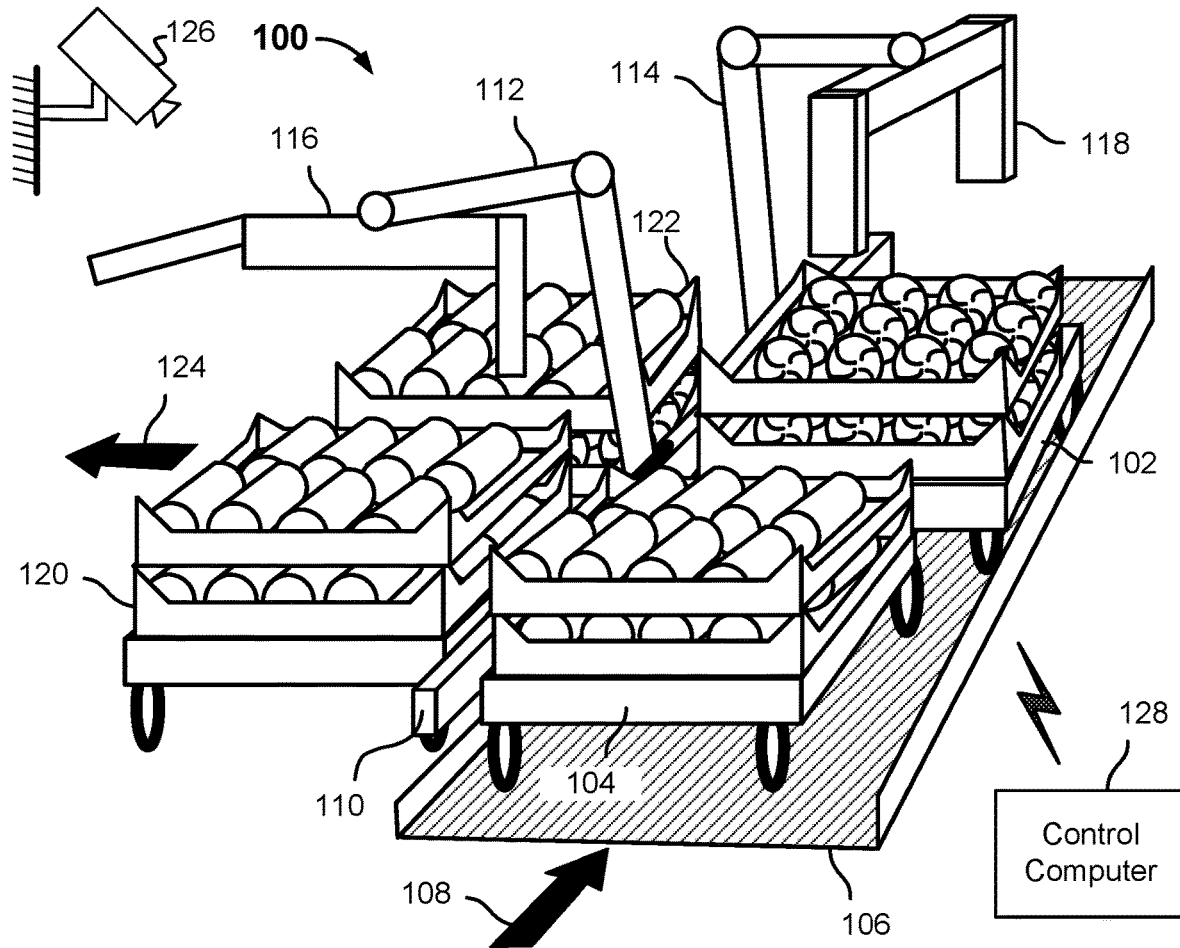
FIG. 1A is a block diagram illustrating an embodiment of a robotic line kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Related art robotic systems may include kitting a set of items (e.g., assembling a kit of items in one or more totes) using a robotic arm. The related art systems move items from a source location within a workspace of the robotic arm and to a destination location within the workspace of the robotic arm. The destination location is generally displaced by a certain distance from the robotic arm. In connection with moving the item to the destination location, related art systems move the robotic arm to proximity of the destination location and in turn place the item at the destination location. Accordingly, related art systems are generally required to traverse a distance from a first location in proximity to the source location which the item is picked to a second location in proximity to the destination location at which the item is to be placed. Such traversal from the first location and the second location in connection with placing the item has a relatively high associated cost with respect to time to complete the move/placement of the item and energy to drive the robotic arm. In the case that the related art system does not traverse from the first location to the second location, the destination location may be located relatively far from a base of the robotic arm, thereby causing the system to incur a relatively high cost (e.g., time and energy) associated with operating the robotic arm to pick and place items.

Various embodiments include a robotic system that is configured to use a buffer zone to stage items. For example, the system uses the buffer area to stage items between picking a product (e.g., an item) from a source location (e.g., a source of incoming product such as a shelf or conveyor), and placing the product in a destination of outgoing product (e.g., a box, a tray, or other receptacle). For example, it may be advantageous to pick an item (e.g., at a good opportunity to do so) and stage the item in the buffer zone until a later time (e.g., when a destination box, bin, tray, or other receptacle is ready to be filled). As another example, the system loads/unloads product to/from a receptacle placed in the buffer zone. In some embodiments, the buffer zone is comprised on a task table (e.g., a carriage tray table) that is mounted to the robot, such as to the robotic arm or a carriage on which the robotic arm is mounted.

Various embodiments include task table for use in a robotic system comprising a robot mounted on a carriage configured to move the robot along a path. The task table includes a substantially horizontal table surface, and one or more mounting arms to which the table surface is affixed at a first distal end and comprising, at a second distal end opposite the first distal end, one or more mounting structures, the one or more mounting arms having a length that allows the table surface to be mounted to the robot or the carriage at a distance from a base of the robot that enables the robot to reach a plurality of locations on the table surface each with a desired pose. As an example, the table surface is fixedly mounted to remain at a particular location/distance with respect to the robot as the robot moves along the path. As an example, the task table is mounted at a distance from a base of the robot such that the robot is able to pick/place items to/from the task table without being configured in a predefined awkward or inefficient pose during the picking/placing operation. As an example, the task table is mounted at a distance between 8 inches and 24 inches from the base of the robot. As another example, the task table is mounted at a distance between 8 inches and 16 inches from the base of the robot. As another example, the distance at which the task table is mounted from the base of the robot is empirically determined based on performing simulations (e.g., simulations in the real world or computer simulations using a model of a robot and workspace comprising item) of picking/placing operations with respect to items to/from the task table, and determining optimal distance(s) based on a success rate of the pick/place operations (e.g., the distance is within a range according to which the robot successfully completes the pick/place operations more than a predefined success threshold), an efficiency of the pick/place operations (e.g., the distance is within a range according to which the robot completes the pick/place operations to a greater extent than a predefined efficiency threshold such as power used or time used to complete the operations). As another example, the distance at which the task table is mounted from the base of the robot is empirically determined based on performing simulations and determining optimal distance(s) according to a predefined cost function. The simulations include performing the picking/placing operations, and then using the predefined cost function for computing respective costs for performing the picking/placing operations with respect to certain distances, heights or ranges of a task table. The system determines the distance(s), height(s) or ranges thereof at which to mount the task table according to parameters for which the cost for picking/placing items to/from the task table is less than a predefined cost threshold.

Various embodiments include a task table that is mounted in a manner that a location of a receptacle (e.g., a tray, tote, box, or other receptacle) placed on the task table relative to the robotic arm (e.g., a base of the robotic arm or carriage on which the robotic arm is mounted) is fixed. A system comprising a task table fixedly connected to the robotic arm or carriage on which the robot is mounted iteratively picks items from their respective source locations and efficiently place the items at the predefined destination location corresponding to the location of the receptacle on the task table. Because the location of the task table relative to the robotic arm is fixed, such a system is not required to travel to a destination location (e.g., use a carriage to traverse a guide rail) in order to place an item after picking the item from the source location. Thus, robotic systems according to various embodiments are more efficient than related art systems. The efficiency of systems according to various embodiments may be further improved by controlling the robotic arm to pick a particular item from a source location, place the particular item at the destination location on the task table while the system controls the carriage to move the robotic arm along an additional axis (e.g., a 6-axis robot can traverse a 7th axis such as a guide rail) to prepare the robotic arm to pick a next item from a corresponding next source location. In other words, the time spent moving the robotic arm from the source location of the first item to the receptacle for placement can be incurred simultaneous with moving the robot (e.g., a base of the robotic arm) to a next location in proximity to the next source location.

Various embodiments include a robotic system comprising a robot, a carriage to which the robot is mounted, the carriage being configured to traverse one or more guide rails, the one or more guide rails, and a task table mounted to the robot or the carriage. The task table enables the system to increase its efficiency in decision-making (e.g., having a predefined location to pick/place items), increases the range of product volumes the system can process, and increase the throughput and efficacy for the system to pick and place items.

Various embodiments include a communication interface, and one or more processors coupled to the communication interface and configured to: determine to move a set of items from respect source locations to one or more receptacles, receive, via the communication interface, data associated with a set of items control the robotic arm to move the set of items to the one or more receptacles based at least in part on the data associated with the set of items. Controlling the robotic arm to move the set of items to the one or more receptacles includes: controlling a robotic arm to pick a first receptacle from a receptacle source location to a task table that is mounted to the robotic arm or a carriage on which the robotic arm is mounted, and determining, for the set of items, a plan to pick a particular item from its respective source location and placing the particular item in the one or more receptacles. The determining the plan for the particular item includes: determining whether the first receptacle has sufficient capacity for a next item of the set of items, in response to determining that the first receptacle has sufficient capacity for the next item, determining a plan to pick the next item from a next item source location and placing the next item in the first receptacle, and in response to determining that the first receptacle does not have sufficient capacity for the next item: determining a plan to move the first receptacle to a receptacle return location, controlling the robotic arm to move the first receptacle to the receptacle return location, determining a plan to move a second receptacle to the task table, controlling the robotic arm to pick the second receptacle from the receptacle source location and place the second receptacle on the task table, and in response to determining that the second receptacle is placed on the task table, determining a plan to pick the next item from a next item source location and placing the next item in the second receptacle.

In some embodiments, the task table is mounted in a location at which the robotic arm is able to move its end effector with relative ease. For example, the task table is located at a position according to which when the robotic arm is picking/placing an item to/from the task table, the robotic arm is in an efficient pose (e.g., the robotic arm is not in an awkward pose, or one or more joint angles of the robotic arm are not in sub-optimal/inefficient positions). Because the task table is disposed at a static position relative to the robotic arm (e.g., a base of the robotic arm or a carriage on which the robotic arm is mounted), the system uses a predefined/optimized routine for moving the end effector of the robotic arm to/from the task table. In some embodiments, the task table is mounted in a position in which the robotic arm is able to reliably pick/place items (e.g., a robotic arm has an expected successful placement rate exceeding a predefined placement rate threshold).

In some embodiments, the task table is mounted in a location at which an inner volume of a receptacle (e.g., a tray) placed on the task table is within the reach of the robotic arm. For example, the inner volume of the receptacle is expected to be in the reachable region for the robotic arm or otherwise at which a location at which the robotic arm is able to reliably pick/place items (e.g., a robotic arm has an expected successful placement rate exceeding a predefined placement rate threshold). In some embodiments, computer simulation of robotic pick/place operations are performed, using a model of the robot (e.g., permissible joint angles) and/or workspace, to determine or predict the reachable region. The reachable region is a 3D space reachable by the robotic arm to pick/place items (e.g., efficiently, without collision of other items, objects or other obstacles in the workspace) from/to the tray. The buffer zone corresponding to the task table is mounted/located such that all locations in the buffer zone (or a receptacle placed in the buffer zone) are fully reachable by the robotic arm (e.g., an expected success rate of pick/place operations with respect to the parts of the area is greater than a threshold success rate).

In addition to, or as an alternative to, using the task table as a location at which a receptacle is maintained during loading/unloading the receptacle, the task table is implemented in systems that use the task table as a buffer area (e.g., a staging) to store one or more items while moving other items in the workspace. For example, if a set of N items are to be moved (e.g., singulated, palletized/depalletized, kitted), the system uses the task table as an area at which to place/store a subset of the N items while another subset of the N items is moved. An illustrative example includes in the case of palletizing a set of N items, the system determines a stacking order in which the set of N items are to be placed on a stack, and the order in which the set of N items are delivered to the workspace/robot (e.g., on a conveyor, etc.) may be different from the stacking order. Accordingly, the system uses the task table as a buffer or staging area for a subset of the N items to allow the system to stack the set of N items in the proper/predefined order (e.g., an order that is expected to result in an ideal stack of items, such as a stable stack, a stack having a lowest cost according to a predefined cost threshold, etc.). As an example, if the system is to stack the set of N items and a small item is delivered to the workspace and the system determines that one or more larger items are to be delivered shortly thereafter (e.g., within a set of N next items), the system places the small item on the task table and proceeds to place the one or more larger items on the stack before retrieving the small item from the task table and placing the small item on the stack. The placement of relatively larger items on the stack before the small item allow for a more stable stack to be generated.

In some embodiments, the task table is a structure with sufficient rigidity/support to maintain a load such as one or more items, a tray, or a tray comprising the one or more items, etc. For example, the task table is mechanically rigid and structurally stable to maintain a cantilevered load while minimizing vibrations during motion (e.g., movement of the robotic arm during picking/placing operations and/or movement of a carriage carrying the robotic arm to a different location within the workspace). The task table is further sufficiently rigid/structurally stable to minimize vibrations during buffer operations in which one or more items are placed on the task table. In some embodiments, the task table is mounted to the carriage or robotic arm using one or more booms. The one or more booms extend laterally from the carriage/robotic arm and support a surface to serve as the task table. Rigidity and strength of the booms may be improved via selection of more rigid or stronger materials (e.g., steel, aluminum, etc.) and selection of dimensions of the booms. The mounting of the task table may further comprise cantilever support or strut that supports the one or more booms and/or table. In some embodiments, the boom(s) and/or cantilever support or strut are positioned and/or shaped to reduce interference between the task table (or support for the task table) and other objects or obstacles within the workspace (e.g., as the carriage moves the robot within the workspace). A first end of the cantilever support or strut is positioned at mid-span (or less) of the task table from the robotic arm. As another example, a first end of the cantilever support or strut is positioned at a location closer to the robotic arm than a mid-span of the task table. A second end of the cantilever support or strut is positioned at a location on the carriage or robotic arm to allow for sufficient clearance with respect to other objects or obstacles (e.g., shelving, etc.) within the workspace.

According to various embodiments, the task table has sufficient dimensions or surface area to accommodate a receptacle of predefined dimensions (e.g., a standard tray, etc.). The task table is configured to securely hold one or more trays (e.g., a stackable tray). In some embodiments, the task table is configured to support at least 200 pounds. In some embodiments, the task table is configured to support up to 100 pounds. In some embodiments, the task table is configured to support up to 50 pounds. As an example, the task table include one or more structures (e.g., tabs) to secure the tray in a particular position or to otherwise prevent the tray from falling from the task table. The one or more structures are further configured/shaped to guide a tray to a particular position on the task table as the robotic arm is placing the tray on the task table. For example, the one or more structures are angled inwards to the inner surface of the task table.

The task table is configured to securely hold one or more trays during operation of the robotic arm, such as in a manner in which vibrations are eliminated or minimized (e.g., reduced to be less than a predefined vibration threshold). In addition to the task table being sufficiently rigid/strong to hold the tray(s), the task table is further configured to be lightweight to reduce the work required to move the robot within the workspace (e.g., along a 7th axis via a carriage, etc.). As an of a lightweight design of the task table includes rails or supports that are configured to hold a tray such that the task table does have a top surface for the entire surface area of the tray to be placed thereon. Another example of a lightweight design of the task table is to include a table surface mounted to booms extending from the carriage/robotic arm, and the table surface has cutouts (e.g., to reduce the weight and/or to allow for a vision system to detect objects or markings below the task table. The extent of the cutouts in the table surface may be increased by the use of flanges that extend a length or width of the task table surface.

In some embodiments, the task table is configured to hold the one or more trays without losing the ability to add (e.g., stack) more trays or other receptacles on top of tray(s) placed on the task table. For example, if a first tray on the task table is deemed full (e.g., a next item is unable to fit within the first tray, a weight of the first tray and items therein exceed a predefined weight threshold, an available space inf the first tray is less than a predefined space threshold), the system controls the robotic arm to retrieve a second tray from a tray source location, stacks the second tray on top of the first tray, and uses the second tray as a further buffer (or for a next set of N items to be kitted such as based on a same manifest, or manifests for different orders). The system serially de-stacks the second tray and the first tray (e.g., grasp each tray individually and move the tray to the corresponding destination location. The system collectively grasps the first tray and the second tray and simultaneously move the first tray and the second tray to a destination location(s). Grasping a plurality of trays and moving the trays to their respective destination location(s) increases the efficiency/throughput of the robotic system (e.g., the collective grasping and moving of the trays allows the system to save on the cost associated with moving the second tray to the destination location, then moving the robotic arm to pick the first tray and repeating the movement of the first tray to the destination location).

In various embodiments, a robotic system as disclosed herein is configured to pick from stationary stacks of trays (or other receptacles) which sit upon dollies (or other carts). An example of such a robotic system is disclosed in U.S. patent application Ser. No. 16/797,359 filed on Feb. 21, 2020 entitled Robotic Handling of Soft Products in Non-Rigid Packaging, the entire contents of which are incorporated herein by reference for all purposes. Another example of such a robotic system is disclosed in U.S. patent application Ser. No. 17/712,915 filed on Apr. 4, 2022, entitled Robotic Tray Gripper, the entire contents of which are incorporated herein by reference for all purposes. Another example of such a robotic system is disclosed in U.S. patent application Ser. No. 17/219,509 filed on Mar. 31, 2021, entitled Suction-Based End Effector with Mixed Cup Sizes, the entire contents of which are incorporated herein by reference for all purposes.

Although embodiments described herein are provided in the context of a kitting system or picking and placing items from a tray, various embodiments may be implemented in various other contexts such as palletizing systems, singulation systems, etc.

As used herein, depalletization includes picking an item from a pallet, such as from a stack of items on the pallet, moving the item, and placing the item at a destination location such as a conveyance structure. An example of a palletization/depalletization system and/or process for palletizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of a singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and placing the one or more items in a predetermined location in a manner that a set of the one or more items correspond to a kit. An example of a kitting system and/or process for kitting a set of items is further described in U.S. patent application Ser. No. 17/219,503, the entirety of which is hereby incorporated herein for all purposes. Another example of a kitting system and/or process for kitting a set of items is further described in U.S. patent application Ser. No. 16/224,513 filed on Dec. 18, 2018, entitled "Robotic Kitting System" (published on Mar. 26, 2020 as U.S. Patent Application Publication No. 2020/0095001), the contents of which are incorporated herein for all purposes.

FIG. 1A is a block diagram illustrating an embodiment of a robotic line kitting system. In the example shown, system 100 includes source tray stacks 102 and 104 moving along an input stack conveyance (e.g., conveyance 106) fed in this example from an input end 108 (staging and loading area). Each of the source tray stacks 102 and 104 in this example is shown to be stacked on a wheeled cart or chassis. In various embodiments, the source tray stacks 102 and 104 are pushed manually onto the conveyance 106, which may be a conveyor belt or other structure configured to advance the source tray stacks 102 and 104 through the workspace defined by conveyance 106. In various embodiments, the source tray stacks 102 and 104 are pushed/pulled onto the conveyance 106 by a robotic arm (e.g., robotic arm 112 or 114), such as a robotic arm being controlled in a third mode in which a multi-mode end effector is used to push/pull a stack of trays. In some embodiments, the chassis or other base structure on which the source trays are stacked is self-propelled. In some embodiments, source tray stacks 102 and 104 are advanced through/by conveyance 106 under robotic control. For example, the speed and times at which the source tray stacks 102 and 104 are advanced by/through conveyance 106 are controlled to facilitate efficient grasping of trays from the source tray stacks 102 and 104.

In the example shown, a single rail (e.g., rail 110) is disposed along one long side of the conveyance 106. In this example, two robots, one comprising robotic arm 112 and another comprising robotic arm 114, are mounted movably, independent of one another, on rail 110. For example, each robotic arm 112, 114 is mounted on a self-propelled chassis that rides along rail 110. In this example, each robotic arm 112, 114 terminates with a tray handling end effector (e.g., end effector 116, 118). In some embodiments, end effector 116 and/or 118 implements end effector 300 of FIGS. 3A-3C.

In various embodiments, the tray handling end effector (e.g., end effector 116 or 118) is operated under robotic control to grasp one or more trays from a source tray stack 102, 104. In some embodiments, the tray handling end effector is comprised in a multi-mode end effector attached to robotic arm 112, 114. Examples of a multi-mode end effector include end effector 300 of FIGS. 3A-3C. The tray handling end effector my correspond to a second grasping mechanism of the multi-mode end effector. For example, the tray handling end effector comprises a plurality of gripper arms, at least a subset of which are movable to adjust a grip of a tray being picked/placed. In some embodiments, the multi-mode end effector further comprises a first grasping mechanism (not shown) configured to pick and place smaller items, such as items comprised in the one or more trays moved by the tray handling end effector. As shown in FIG. 1A, each end effector 116, 118 includes a lateral member attached to the end of the robotic arm 112, 114. A side member is mounted on each end of the lateral member. As shown, at least one of the side members is opened or closed under robotic control, in various embodiments, to enable a tray to be grasped (by closing the side member) or released (by opening the side member). In some embodiments, the at least one side member that is opened or controlled under robotic control is configured to rotate around an axis perpendicular to the axis of the length of the lateral member. In some embodiments, the at least one side member that is opened or controlled under robotic control is configured to move along, or substantially along/parallel with, the axis of the length of the lateral member.

In various embodiments, each end effector 116, 118 (e.g., the second grasping mechanism of the multi-mode end effector or another tray-handling end effector) includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays. In other examples, the movable or "active" side member is moved in a lateral translation substantially parallel with the length of a lateral member of the multi-mode end effector from which the "active" and "passive" side members are connected or otherwise extend. In other words, the "active" side member is moved in direction substantially corresponding to the axis of the lateral member in order to widen the grip of the second grasping mechanism or to shorten the grip of the second grasping mechanism when applying a force on a tray to be picked/placed. In various embodiments, a robotic control system (e.g., a computer that controls robotic arms 112, 114, such as control computer 128) controls the end effector to actuate the opening/closing of the end effector such as in connection with grasping or releasing a tray. The robotic control system (e.g., control computer 128) controls the end effector based at least in part on image data of the workspace and/or one or more sensors comprised in (or connected to) the corresponding end effector. In some embodiments, the one or more sensors comprised in (or connected to) the corresponding end effector are configured to: (i) obtain information indicative of whether a grasping mechanism (e.g., an active member of the second grasping mechanism) of the multi- mode effector is in an open position or a closed position, (ii) obtain information indicative of an extent to which the grasping mechanism is open, (iii) obtain information indicative of when the tray (or end effector relative to the tray) is in a position at which the multi-mode end effector is controlled to engage at least one side of the multi-mode end effector (e.g., a passive member or a structure comprised on the passive member) with a hole, a recess, or the a comprised in a side of a tray (e.g., a tray being grasped), (iv) obtain information indicative of when the tray (or end effector relative to the tray) is in a position at which the multi-mode end effector (e.g., a passive member or a structure comprised on the passive member) is engaged with the hole, the recess, or the handle comprised in the a side of a tray, (v) obtain information indicative of whether the grasping mechanism is closed or otherwise engaged with the tray, (vi) obtain information indicative of whether the second grasping mechanism is in an inactive state or an active state, (vii) obtain information indicative of whether an item is grasped by the first grasping mechanism (e.g., the suction-based end effector) of the multi-mode end effector, (viii) obtain information indicative of an attribute of the first grasping mechanism (e.g., a pressure between the suction-based end effector and the item being grasped, an indication of whether the first grasping mechanism is engaged with an object, (ix) obtain information indicative of a state of the first grasping mechanism (e.g., information indicative of the state of the suction cups, such as a position of the suction cups in the case that relative positions of the suction cups can be changed to widen or shorten a distance between at least two suction cups, etc.).

In various embodiments, each end effector 116, 118 includes on each side member one or more protrusions or similar structures of a size and shape such that the protrusion, etc., fits into and, in various embodiments, can be slid under robotic control into holes or other openings in the sides the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

In various embodiments, the respective robotic arms 112, 114 are operated at the same time, fully autonomously, to pick trays from source tray stacks 102, 104 and place them on destination tray stacks, such as destination tray stacks 120, 122, in a destination tray stack assembly area on an opposite side of rail 110 from conveyance 106 and source tray stacks 102, 104. The destination tray stacks are assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stack 120, 122. Completed destination tray stacks 120, 122 are removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one of more of conveyance 106; the wheeled chassis on which source tray stacks 102, 104 are stacked (if self-propelled); the robotic arms 112, 114 and/or the respective chassis on which the robotic arms 112, 114 are mounted on rail 110; and the robotically controlled tray handling end effectors (e.g., end effectors 116, 118). In various embodiments, the robotic elements are controlled by control computer 128 based on input data, such invoice, order, and/or manifest information, as well as input state information, such inventory data indicating which source tray stacks include which type and/or quantity of product.

In various embodiments, source tray stacks 102, 104 are inserted into a gate or other ingress/control structure at the input end 108 of conveyance 106. Conveyance 106 comprises an apparatus (stack mover) that moves the source tray stacks 102, 104 along the rail 110 to optimize throughput and minimize robot displacement, e.g., by minimizing how far and/or often the robotic arms 112, 114 must be moved along rail 110 to grasp source trays and place them on respective destination stacks. The source tray stacks 102, 104 can come in with trays in different orientations/weights/ and weight distribution. The system 100 uses force and moment control to operate robotic arms 112, 114 to insert a thumb or other protrusion gently and securely into a tray and plans its motion and tray trajectory in order to not collide with itself or the environment. In various embodiments, each robotic arm 112, 114 operates in a very tight space of roughly 2.5 m in width and has a very light footprint. The robot utilizes its full workspace and intelligently plans its motion optimizing its grasp. The robot recognizes the need to perform orientation changes and handles that accordingly while avoiding obstacles. The robot moves to the correct output (e.g., destination tray stack 120, 122) corresponding to the right customer while coordinating with the other robots on the rail 110. The robot then uses advanced force control and interactions with the environment to figure out a proper place strategy. The cycle then restarts.

In the example shown in FIG. 1A, the system 100 includes a 3D camera 126. In various embodiments, the system 100 includes a plurality of 3D (or other) cameras, such as camera 126, and uses image and depth data generated by such cameras to generate a three-dimensional view of at least relevant portions of the workspace and scene, such as the scene/state shown in FIG. 1A. In some embodiments, cameras such as camera 126 are used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

In some embodiments, a robot (e.g., robotic arm 112, 114) is configured with a task table mounted to the robot or a carriage on which the robot is mounted. Examples of the task table according to various embodiments are further described in connection with FIGS. 4A-4C, 5, 6, 7A-7B, and 8-10. The task table is sufficiently rigid/strong to support one or more items, or one or more trays comprising one or more items. As an example, the task table is configured/designed to support a predefined threshold amount of weight. System 100 can use the task table for a robot as a buffer or staging area for the robot to place items while continuing to perform a set of tasks.

In the case of the robot packing a set of items into a tray, system 100 controls the robot to pick and place the tray (e.g., an empty tray) on the task table, and while the tray is on the task table to operate the robot to pick and place the various items to be packed (e.g., according to a manifest, order, etc.). System 100 controls the robot to place a subsequent tray (e.g., an empty tray) on top of the tray(s) already placed on the task table, and system 100 can control the robot to pick and place items into the subsequent tray. After packing the one or more trays on the task table, system 100 controls the robot to pick the one or more trays (e.g., collectively pick up the one or more trays, or any combination of the one or more trays) and place the trays in a destination location, such as a cart or conveyor to carry out fulfilled orders.

In the case of the robot unpacking a set of items from a tray, system 100 controls the robot to pick and place the tray (e.g., a full/semi-full tray) on the task table, and while the tray is on the task table to operate the robot to pick and place the various items from the tray on the task table and place the items at their respective destination locations (e.g., a conveyor to carry received items to another location in the warehouse). System 100 controls the robot to place a subsequent tray (e.g., another full tray) on top of the tray(s) already placed on the task table, and system 100 can control the robot to pick items from the subsequent tray and place at their respective destination locations. After unpacking the one or more trays on the task table, system 100 controls the robot to pick the one or more trays (e.g., collectively pick up the one or more trays, or any combination of the one or more trays) and place the trays in a destination location (e.g., a tray return location, a conveyor, etc.).

In some embodiments, a robotic singulation system or a robotic palletization system uses the task table as a buffer or staging area in which the system temporarily places one or more items while continuing to perform other tasks, such as moving other items within the workspace. For example, the system uses the task table as part of the solution space for optimizing placement of items (e.g., to result in an optimized or acceptable stacking or placement/order of items). As another example, the system uses the task table as a buffer or staging area to store items in a manner to re-order the placement of items in a destination location.

Although a single camera (e.g., camera 126) mounted to a wall in the workspace of system 100 is shown in FIG. 1A, in various embodiments, multiple cameras or other sensors, or a combination thereof, are mounted statically in a workspace. In addition, or instead, one or more cameras or other sensors are mounted on or near each robotic arm 112, 114, such as on the arm itself and/or on the end effector 116, 118, and/or on a structure that travels with the robotic arm 112, 114 as it is moved along rail 110. In some embodiments, system 100 comprises one or more sensors (e.g., cameras, etc.) configured to obtain information pertaining to items, trays, or other receptacles placed on a task table of a robot (e.g., robotic arm 112, 114). For example, the one or more sensors are directed towards the task table and/or obtain information indicating one or more attributes of the items/trays on the task table or one or more identifications associated with the items/trays (e.g., to read a barcode on an item), etc.

Figure 1B:
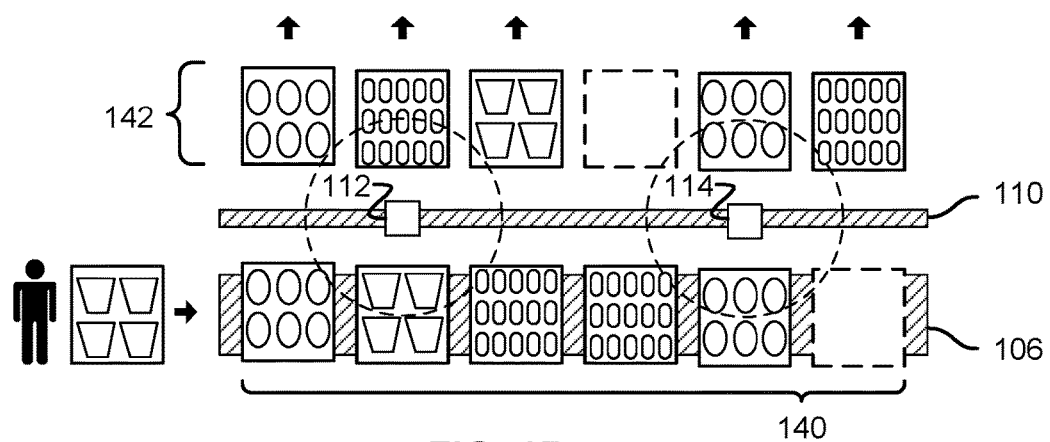
FIG. 1B is a block diagram illustrating an embodiment of a robotic line kitting system.

FIG. 1B is a block diagram illustrating an embodiment of a robotic line kitting system. In FIG. 1B, an example is shown of an overhead view of a workspace in which the system 100 of FIG. 1A operates. In the example shown, robotic arms 112, 114 move along a common rail (e.g., rail 110), as in FIG. 1A, to access and pick trays from source stacks 140 moving along conveyance 106 and play trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows that the top of FIG. 1B, which corresponding to arrow 124 of FIG. 1A.

While in the example shown in FIGS. 1A and 1B the trays each contain only one type of time, in other embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 is provided with information indicating which types of trays are in which position in each source tray stack, and uses that information, along with manifest or other information indicating the required contents of each destination tray stack, to build the required destination tray stacks by picking needed trays each from a corresponding position on a source tray stack and adding the tray to a corresponding destination stack.

Figure 2A:
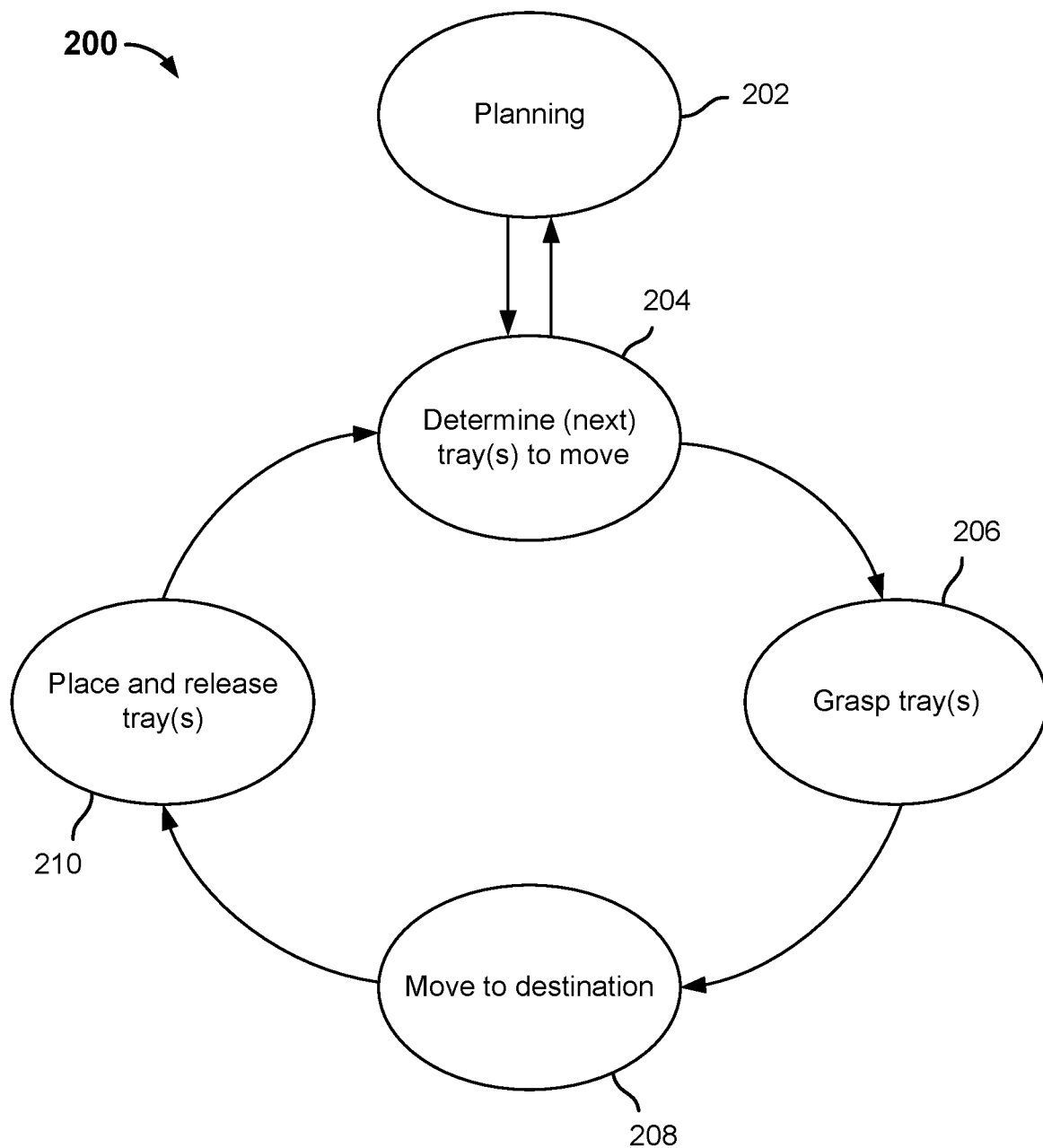
FIG. 2A is a state diagram illustrating an embodiment of an automated process to assemble stacks of trays.

FIG. 2A is a state diagram illustrating an embodiment of an automated process to assemble stacks of trays. In various embodiments, processing according to the state diagram 200 is performed by a control computer, such as control computer 128 of FIG. 1A. In the example shown, a planning state, process, and/or module 202 generates and dynamically updates a plan to assemble output stacks of trays by using robotic instrumentalities as disclosed herein to pick trays from homogeneous or non-homogeneous source stacks of trays and building destination stacks each having one or more types of trays, e.g., according to a set of orders, invoices, manifests, etc. The planning state, process, and/or module 202 receives feedback indicating which destination tray stacks have been completed, which stacks of source trays have been moved into the workspace, and/or other state and context information which can be used to continuous update the plan to pick and place (stack) trays to assemble the destination stacks. In state 204, a process controlling a given robotic instrumentality (e.g., robotic arms 112 and/or 114 and associated end effectors 116 and 118, in the example shown in FIG. 1A) determines a next set of one or more trays to be move from a source stack to a destination stack according to a current overall plan as received from planning state, process, and/or module 202. For example, the robot determines to grasp one, two, or more trays from a source stack to add them to (or start a new) destination stack. The robot enters state 206, in which a strategy and plan is determined to do one or more of move into position to grasp the tray(s), grasp the trays, and/or begin to move them toward the destination stack location is formed; and the robot moves into position and grasps the trays. Once the tray(s) has/have been grasped, the robot enters state 208 in which the tray is moved along a planned (and, if needed, dynamically adapted) trajectory to the vicinity of the destination stack, e.g., a position hovering over the destination stack and/or a location or structure on which the destination stack is to be built. In state 210, the robot place(s) the tray(s) on the destination stack. In some embodiments, the state 210 includes maneuvers under force control to verify the tray(s) is/are place securely on the destination stack, e.g., by moving (or attempting to move) the tray(s) forward and backward (or side to side, as applicable) to ensure any interconnecting structures are aligned and well slotted, such as tabs on the bottom of the trays being placed fitting into corresponding recesses in the side walls of the tray on which the tray(s) is/are being placed. Once the trays are determined to have been placed securely, the robot releases the tray(s) and reenters the state 204, in which a next set of one or more trays is determined to be picked from a corresponding source stack and moved to a corresponding destination stack, e.g., according to overall plan information received from planning state, process, and/or module 202. In various embodiments, a robotic system as disclosed herein continues to cycle through the states 204, 206, 208, and 210 of FIG. 2A until all destination stacks have been assembled.

Figure 2B:
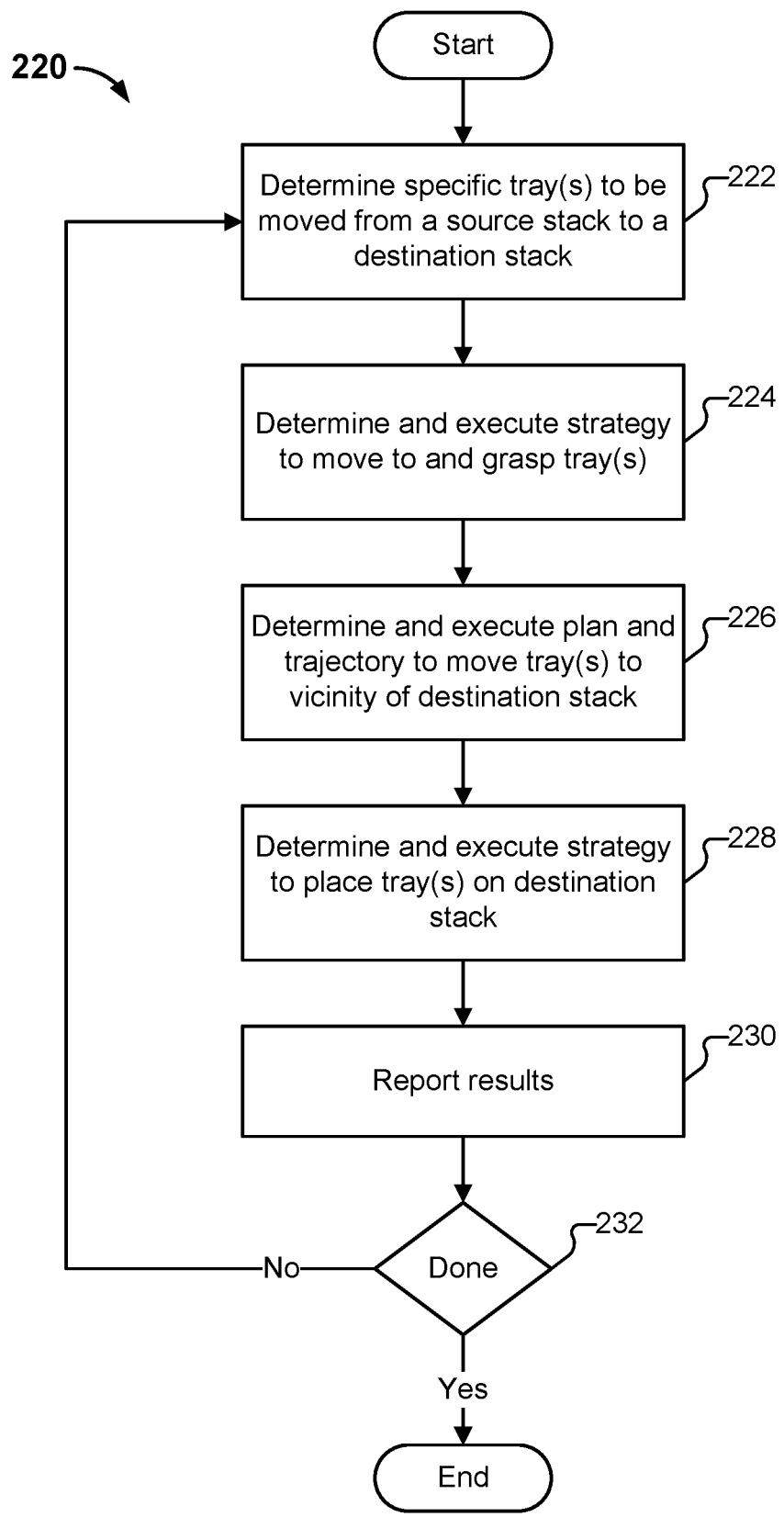
FIG. 2B is a flow diagram illustrating an embodiment of an automated process to assemble stacks of trays.

FIG. 2B is a flow diagram illustrating an embodiment of an automated process to assemble stacks of trays. In various embodiments, a process or module controlling one or more tray handling robots implements the process 220 of FIG. 2B. In various embodiments, the process 220 of FIG. 2B is performed by process or module running on a control computer, such as control computer 128 of FIG. 1A. In some embodiments, process 220 is performed in connection with using a second grasping mechanism of a multi-mode end effector (e.g., a grasping mechanism with gripper arms, etc.) to grasp a tray. In the example shown, at 222 a specific set of one or more trays is determined to be moved from a source stack to a destination stack. In some embodiments, a robotic arm has an end effector (e.g., a second grasping mechanism) that accommodates picking and placing only one tray at a time. In other embodiments, a robot has an end effector that can grasp a stack of two or more trays, e.g., by grasping a bottommost one of the trays in the stack to be grasped. At 224, a strategy to move to and grasp the tray(s) is determined. For example, the robot plans and implements a set of maneuvers to move its end effector to a position above or otherwise near the tray(s) to be grasped. As another example, the robot plans and implements an operation to control the end effector to grasp trays. The robot controls the end effector (e.g., a multi-mode end effector) to change modes in connection with grasping a tray or item from the tray (e.g., to control the end effector to use a first grasping mechanism or second grasping mechanism based at least in part on whether the end effector is to grasp a tray or an item from a tray, etc.). A strategy to grasp the tray(s) is determined and implemented. At 226, a plan (e.g., trajectory) to move the tray(s) to a destination stack is determined and executed. The trajectory/plan takes into consideration obstacles in the workspace, such as other stacks, and potential conflicts with other robotic instrumentalities, such as another pick/place robot operating in the same workspace (e.g., robotic arms 112, 114 of FIG. 1A). At 228, a strategy to place the tray(s) atop the corresponding destination stack is determined and executed. At 230, results of the pick/place operation are reported, e.g., to a planning process or module. Subsequent iterations of steps 222, 224, 226, 228, and 230 are repeated until it is determined at 232 that processing is done, e.g., all destination stacks have been completed.

Figure 2C:
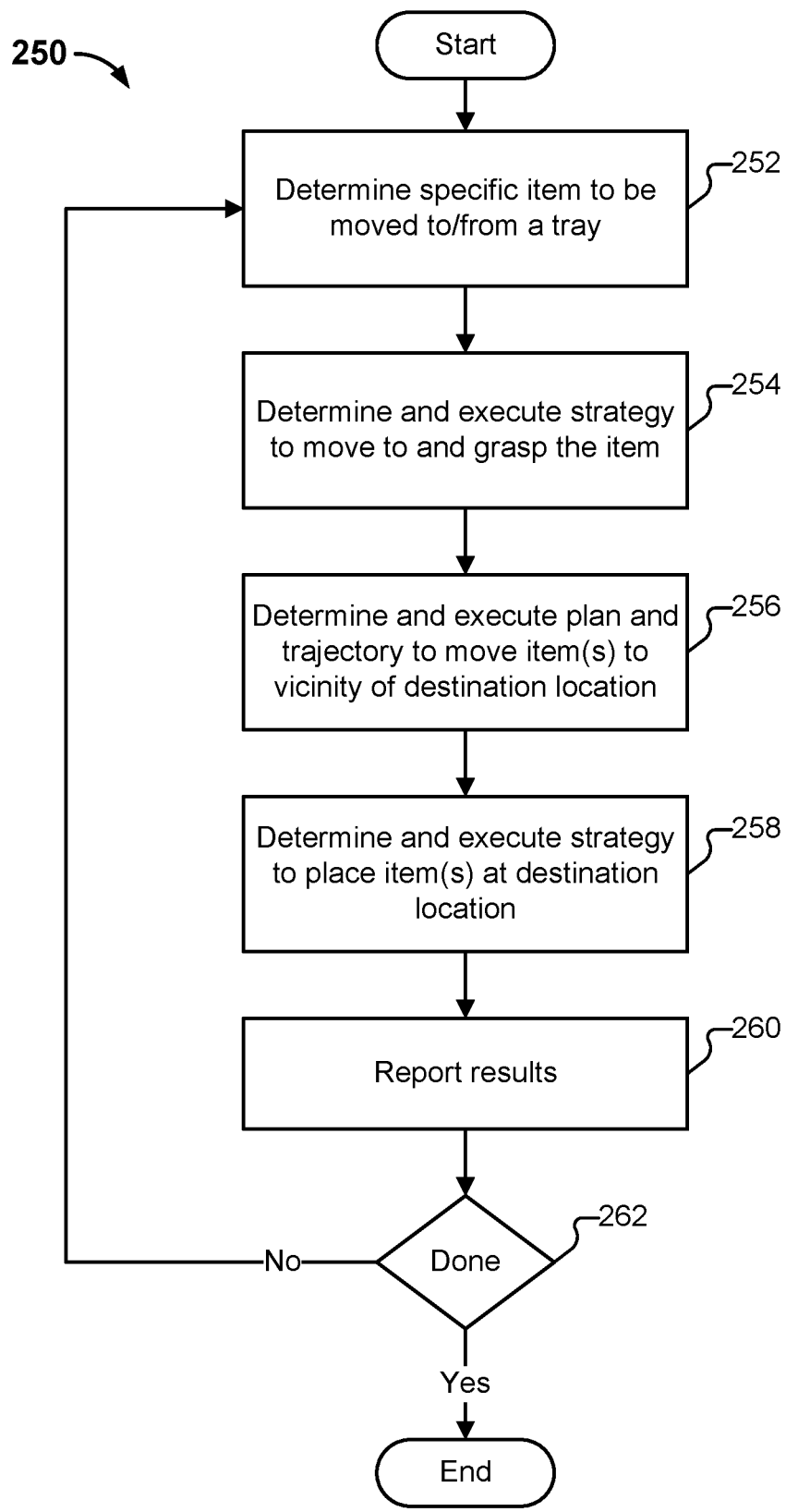
FIG. 2C is a flow diagram illustrating an embodiment of an automated process to pick and place items to/from a tray.

FIG. 2C is a flow diagram illustrating an embodiment of an automated process to pick and place items to/from a tray. In some embodiments, process 250 is implemented by system 100 of FIG. 1A. In some embodiments, process 250 is performed in connection with using a first grasping mechanism of a multi-mode end effector (e.g., a grasping mechanism with suction cups for suction-based grasping, etc.) to pick/place an item from/to a tray. In various embodiments, a process or module controlling one or more tray handling robots implements the process 220 of FIG. 2B. In various embodiments, the process 220 of FIG. 2B is performed by process or module running on a control computer, such as control computer 128 of FIG. 1A.

In the example shown, at 252 a specific set of one or more items is determined to be moved from a source location to a destination location. For example, the system determines to retrieve the item from a source location (e.g., a kitting shelf, conveyor, etc.) and place an item in a tray or other receptacle. As another example, the system determines to pick the item from a tray and place the item at a destination location (e.g., conveyor, chute, other receptacle, etc.). In some embodiments, a robotic arm has an end effector (e.g., a first grasping mechanism such as a suction-based end effector) that accommodates picking and placing only one item at a time. In other embodiments, a robot has an end effector that can grasp a plurality of items (e.g., by grasping each of the items using a different subset of suction cups of the suction-based end effector).

At 254, a strategy to move to and grasp the item is determined. For example, the robot plans and implements a set of maneuvers to move its end effector (e.g., a suction-based end effector of a multi-mode end effector) to a position above or otherwise near the item(s) to be grasped. As another example, the robot plans and implements an operation to control the end effector to grasp items. The robot controls the end effector (e.g., a multi-mode end effector) to change modes in connection with grasping a tray or item from the tray (e.g., to control the end effector to use a first grasping mechanism or second grasping mechanism based at least in part on whether the end effector is to grasp a tray or an item from a tray, etc.). A strategy to grasp the item(s) is determined and implemented.

At 256, a plan (e.g., trajectory) to move the item(s) to a destination location is determined and executed. The trajectory/plan takes into consideration obstacles in the workspace, such as other items, stacks of trays, and potential conflicts with other robotic instrumentalities, such as another pick/place robot operating in the same workspace (e.g., robotic arms 112, 114 of FIG. 1A).

At 258, a strategy to place the items at the corresponding destination location (e.g., a destination tray, a conveyor, etc.) is determined and executed.

At 260, results of the pick/place operation are reported, e.g., to a planning process or module. Subsequent iterations of steps 252, 254, 256, 258, and 260 are repeated until it is determined at 262 that processing is done, e.g., all item(s) have been picked and placed (e.g., items corresponding to a manifest such as an order or packing slip, or the tray from which the items are picked is empty, or the tray in which the items are placed is full).

Figure 3A:
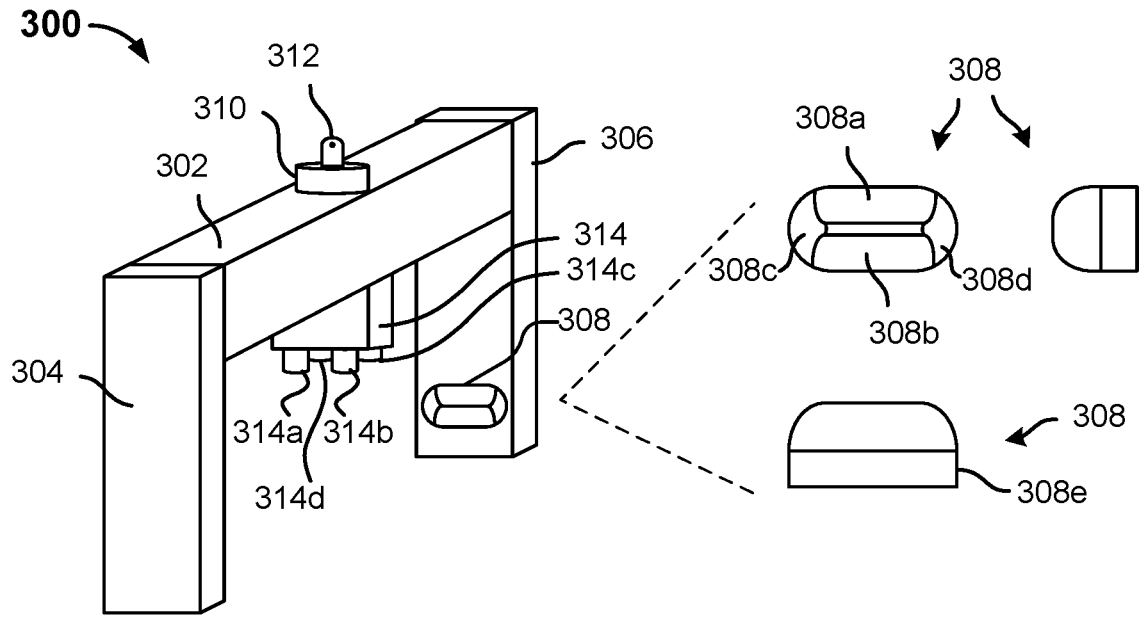
FIG. 3A is a diagram illustrating an embodiment of a robotically controlled tray handling end effector.

FIG. 3A is a diagram illustrating an embodiment of a robotically controlled tray handling end effector. In some embodiments, end effector 300 is implemented in connection with system 100 of FIG. 1A such as by robot arms 112, 114. End effector 300 is a multi-mode end effector comprising at least two grasping mechanisms (e.g., a first grasping mechanism and a second grasping mechanism). In some embodiments, end effector 300 is robotically controlled to operate according to different modes, such as based on a task to be performed. For example, end effector 300 operates in a first mode in which a first grasping mechanism (e.g., a suction-based end effector is used to pick/place an item). As another example, end effector 300 operates in a second mode in which a second grasping mechanism (e.g., an end effector having gripper arms is used to pick/place a tray). As another example, end effector 300 operates in a third mode in which a structure on end effector 300 is used to push/pull a tray or a stack of trays.

In the example shown, end effector 300 includes a plurality of grasping mechanisms. In some embodiments, end effector 300 comprises (i) a first grasping mechanism corresponding to a suction-based end effector 314, and (ii) a second grasping mechanism comprising gripper arms (e.g., side members). The different grasping mechanisms comprised in end effector 300 are used for different functions or in different modes. Suction-based end effector 314 comprises one or more suction cups 314*a*, 314*b*, 314*c*, and 314*d*. In some embodiments, end effector 300 is robotically controlled to grasp objects (e.g., trays, items in trays, etc.) based on selectively controlling one or more of the first grasping mechanism and the second grasping mechanism. A robotic system controls a robot comprising end effector 300 to pick/place items and/or trays from/to a task table mounted to the robotic system.

As illustrated in FIG. 3A, end effector 300 comprises a lateral member 302 to the first grasping mechanism and/or a plurality of elements for the second grasping mechanism are mounted. For example, end effector 300 comprises lateral member 302 which a side member 304 is fixedly mounted and a side member 306 is hinge or otherwise movably mounted in a manner that enables side member 306 (e.g., active side member) to be moved to an open position that facilitates moving the end effector 300 into a position to grasp a tray. An active side thumb 308 is positioned on (or comprises an integral part or feature of) an inner face of side member 306. In some embodiments, both gripper arms (e.g., side members) are movable with respect to lateral member 302 such as in connection with extending or shortening a grip between the gripper arms.

According to various embodiments, side member 306 is movable within a predefined range of motion. As an example, end effector 300 includes one or more stopping mechanisms (e.g., stopper, switch, or the like, or a combination thereof) that restrict movement of the side member 306 to within the predefined range of motion. End effector 300 includes an open position stopping mechanism that prevents side member 306 from moving in an opening direction past an open position threshold (e.g., 130 degrees relative to a plane/vector along which lateral member 302 extends in a lengthwise direction, or between 30 and 50 degrees relative to a closed position at which side member 306 is substantially normal to the plane/vector along which lateral member 302 extends). End effector 300 includes a closed position stopping mechanism that prevents side member 306 from moving in a closing direction past a closed position threshold (e.g., about 90 degrees relative to a plane/vector along which lateral member 302 extends in a lengthwise direction, etc.). Various values can be selected for the open position threshold and/or the closed position threshold. In some embodiments, the open position threshold is set based at least in part on an environment in which the robot to which end effector 300 is connected operates. As an example, if a plurality of robots is operating within a relatively close proximity, the range of motion of the side member 306 is based at least in part on a distance between robots or between zones in which the various robots (e.g., neighboring robots) operate. As the side member 306 moves from a closed position to an open position the further the side member 306 extends in the x-direction. In addition, the further the side member 306 is movable from the closed position to the open position, the greater the time required for the robotic system to control to open/close side member 306 in connection with grasping/placing a tray(s). Accordingly, limiting the range of motion of the side member 306 (e.g., to a sufficient open position threshold to permit the end effector to grasp a set of one or more tray(s) with ease) allows the robotic system to operate more efficiently within proximity of other robots (e.g., other robots that are autonomously grasping, moving, and placing trays).

The active side thumb 308 and a corresponding structure on the inner face of side member 304, not visible in FIG. 3A, are of a size and shape suitable to be inserted into a handhold or other recess or hole on opposite sides of a tray to be grasped by the end effector 300. In various embodiments, the thumbs 308 are removable and replaceable, e.g., to be replaced once they are worn out from use or to be exchanged with a thumb having a different shape, dimensions, materials, etc. suitable to grasp a different type of tray, for example. Active side thumb 308 is fixedly mounted to side member 306 such as to impede thumb 308 from rotating (e.g., during engagement with tray handle, etc.). For example, active side thumb is mounted to side member 306 at three mounting points. Various other mounting configurations or number of mounting points may be implemented. As shown in the three-view drawing to the right of FIG. 3A, in the example shown the thumb 308 has convex surfaces 308a-d on each of four sides. In various embodiments, the convex surfaces 308a-d facilitate using force and moment control to insert the thumb 308 into a handle or other hole or recess in the side of a tray to be grasped. In some embodiments, the convex surfaces are used in conjunction with active force control and orientation impedance control to ensure a gentle and secure final grasp, where the active side is fully into the tray. For example, even if imperfectly aligned, a convex surface 308a-d engaged in a side or edge of a hole enable the rest of the thumb 308 to more readily be slid more fully into the hole. Flat surfaces 308e at the base of the thumb, nearest the inner side wall of the side member 304, 306 on which the thumb 308 is mounted, in various embodiments enable misalignment to between the end effector 300 and the tray(s) being grasped to be corrected and/or alignment refined. For example, in a picking episode, a thumb of the side member 304 (e.g., the passive side member) is moved into position near a handle or other hole on one side of the tray to be grasped. The convex surfaces 308a-d are used, under force control, to slide the thumb partway into the hole. The flat surfaces 308e near the base of the thumb are used to better align the passive side with the tray prior to closing the side member 306.

Referring further to FIG. 3A, in the example shown end effector 300 includes a force sensor 310 mounted on lateral member 302 and a bracket 312 to attach the end effector 300 to a robotic arm. In some embodiments, end effector 300 is attached to a robotic arm via a pin inserted through a hole in bracket 312, enabling the end effector 300 to swing freely and/or be rotated under robotic control, e.g., using one or more motors, about a longitudinal axis of the pin. In various embodiments, force sensor 310 detects forces/moments experienced by end effector 300 in an x, y, and/or z direction. Force sensor 310 may have a single axis overload of force in the x or y direction (e.g., $F_{xy}$) of at least ±10000 N and/or a single axis overload of force in the z direction of at least ±30000 N (e.g., $F_z$). Force sensor 310 may have a single axis overload of torque in the x or y direction (e.g., $T_{xy}$) of at least ±1000 Nm and/or a single axis overload of torque in the z direction of up to at least ±1000 Nm (e.g., $T_z$). In some embodiments, force sensor 310 has a single axis overload of force in the x or y direction (e.g., $F_{xy}$) of about ±18000 N and/or a single axis overload of force in the z direction of about ±48000 N (e.g., $F_z$); and a single axis overload of torque in the x or y direction (e.g., $T_{xy}$) of about ±1700 Nm and/or a single axis overload of torque in the z direction of about ±1900 Nm (e.g., $T_z$).

In various embodiments, side member 304 is fixedly mounted to lateral member 302. The fixed mounting of the side member 304 enables forces and moments acting on end effector 300 (e.g., on side member 304) to propagate through the frame of the end effector (e.g., lateral member 302 and side member 304) to force sensor 310. For example, the fixed mounting of the side member 304 avoids forces and movements from translating into a movement of other parts of the end effector such as side member 306 (e.g., an active member) when side member 306 is being actuated to move thumb 308 to engage with a tray handle (e.g., to insert thumb 308 into the tray handle).

Figure 3B:
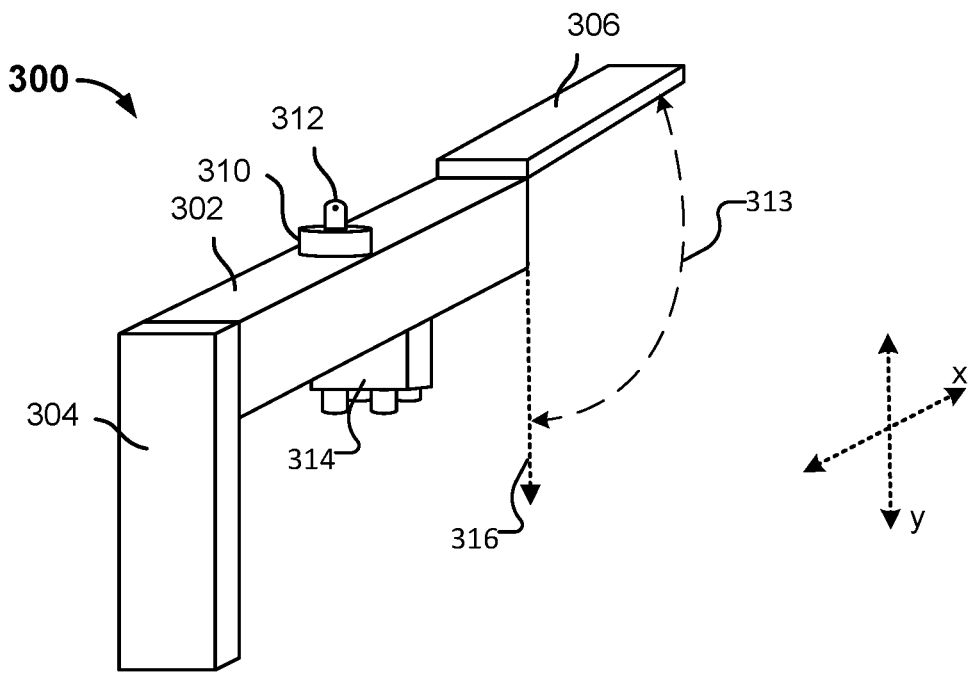
FIG. 3B is a diagram illustrating an embodiment of a robotically controlled tray handling end effector.

FIG. 3B is a diagram illustrating an embodiment of a robotically controlled tray handling end effector. End effector 300 comprises a second grasping mechanism that is controlled (e.g., during the second mode of operation of the multi-mode operation) to grasp items using gripper arms (e.g., side members 304, 306). In some embodiments, end effector 300 is controlled to move one or more of the gripper arms to open a grip to allow end effector 300 to move into position to grasp an object (e.g., a tray) and to move one or more of the gripper arms to close the grip on the object to be grasped.

In the state shown in FIG. 3B, the active side member 306 has been opened to the open position, e.g., by a pneumatic or hydraulic piston, motor, or other motive force and structure housed in lateral member 302 (not shown) in FIG. 3B. Vector/direction 316 illustrates an example of a closed position (e.g., the closed position threshold). In various embodiments, the closed position is a configuration according to which side member 306 forms a normal vector relative to lateral member 302. For example, the closed position threshold is 90 degrees (or substantially 90 degrees) relative to a direction along which lateral member 302 extends. As illustrated in FIG. 3B, side member 306 is moved to an open position. As side member 306 is moved to the open position, an angle between side member 306 and vector/direction 316 is represented as angle 313. According to various embodiments, the open position threshold corresponds to a configuration at which angle 313 is between 35 degrees and 50 degrees. In some embodiments, open position threshold corresponds to a configuration at which angle 313 is between 40 degrees and 50 degrees. In some embodiments, open position threshold corresponds to a configuration at which angle 313 is between about 40 degrees and about 45 degrees.

In various embodiments, robotic system controls side member 306 (e.g., controls an actuation device to move side member 306) based at least in part on information obtained by one or more sensors, such as a sensor(s) comprised in side member 306 (e.g., thumb 308 of side member 306), a sensor(s) comprised in side member 304 (e.g., a thumb of passive side member), a camera or other sensor comprised on or around the robot to which end effector 300 is connected (e.g., to capture information pertaining to the workspace of the robot), and the like, or any combination thereof. Side member 306 is controlled according to a plan to grasp, move, and/or place a set of one or more trays and the information obtained from the one or more sensors. Side member 306 is further controlled according to obstacles within the workspace of the robot such as another stack of trays (e.g., an adjacent stack), another robot working to remove a tray another stack of trays (or of the same tray).

In various embodiments, tray pick operations as disclosed herein are smooth, gentle, and precise and are tolerant to uncertainty and disturbances. In various embodiments, a pick episode using the second grasping mechanism (e.g., grasping a tray using gripper arms) includes one or more of:

Lowering to a target pose (adjacent tray) from the hover pose (above stack) coupled with height checks to refine estimation of where the tray handle is and a dynamic goal adjustment.

Using the active side surface of the end effector to control any uncertainties in the direction of the rail be it a misplaced tray or a human error. In various embodiments, after moving to the hover pose, the robot lowers into the position to align with the handle, and while it does this lowering motion, force control is used to ensure that the alignment in the rail direction is perfect (or substantially perfect). This can be very likely because the gripper almost perfectly fits the length of the tray in between itself, and any misalignment can lead to contact. This contact is ensured to be on the active side panel, which has a diagonal plane—meaning that the robotic system can effectively use the contact between the gripper and the misaligned trays to adjust our position using force control.

Proceeding to use a three degree of freedom (3 DOF) force controller (e.g., based on sensor readings from force sensor 310) to find the position of the (tray handle) slot on the passive side and insert the passive side thumb into the slot using the convexity of the thumb (e.g., one or more of surfaces 308a-d, depending on which engage with the tray). In some embodiments, a 6 DOF controller is used to perform XYZ force control to ensure that the thumb is inserted and XYZ axis moment to ensure that the plane of the passive side panel is flush against the plane of the tray outer surface. In some embodiments, one or more sensors in side member 304 (or in the thumb of side member 304) are used to obtain information associated with a location of the tray, such as information indicating a position of the second side member relative to the first tray, information indicative of when the first tray is in a position at which the end effector is controlled to engage the passive-side structure with the hole (e.g., to detect when the tray is in proximity of the tray such as at an entry of the gripper such as for detection that end effector 300 is properly positioned to begin a process of engaging the tray with side member 304, etc.), the recess, or the handle comprised in the first structure, information indicative of when the first tray is in a position at which the passive-side structure is engaged with the hole, the recess, or the handle comprised in the first structure, and the like, or any combination thereof.

Using the flat extremities (e.g., 308e) of the thumbs to adjust for any orientation mismatch.

When all is good (e.g., in response to a determination that the side member 304 and/or active side member is positioned properly to grasp the tray, etc.), close the active side (e.g., 306) with force/moment control, to account for any residual orientation or positional uncertainty in the tray pose, and lift the tray up to make sanity checks for the quality of the grasp (e.g., weight as expected, forces and moments balanced and otherwise consistent with good grasp). In some embodiments, when the state of the gripper is deemed good, the active side is closed with force/moment control enabled in order to refine and correct for any residual orientation/position errors, which ensure gentle handling of the tray.

The robot safely aborts the pick if it detects any anomalies related to weight or quality of the trays in the stack or the quality of the stacking itself.

According to various embodiments, end effector 300 is controlled to actuate a second grasping mechanism between an active state (e.g., a deployed state) and an inactive state (e.g., a retracted state). As an example, when end effector 300 is controlled to operate in a first mode (e.g., to use a first grasping mechanism to grasp an item from a tray), the second grasping mechanism is actuated to be configured in an inactive state. During operation in the first mode, end effector 300 is transitioned to the inactive state in which one or more elements of the second grasping mechanism are moved to allow the first grasping mechanism to grasp the object (e.g., the item in a tray, etc.). As another example, when end effector 300 is controlled to operate in a second mode (e.g., to use a second grasping mechanism to grasp a tray), the second grasping mechanism is actuated to be configured in an active state. During operation in the second mode, end effector 300 is transitioned to the active state in which one or more elements of the second grasping mechanism are moved to allow the gripper arms to engage a tray or other object grasped by the second grasping mechanism.

Figure 3C:
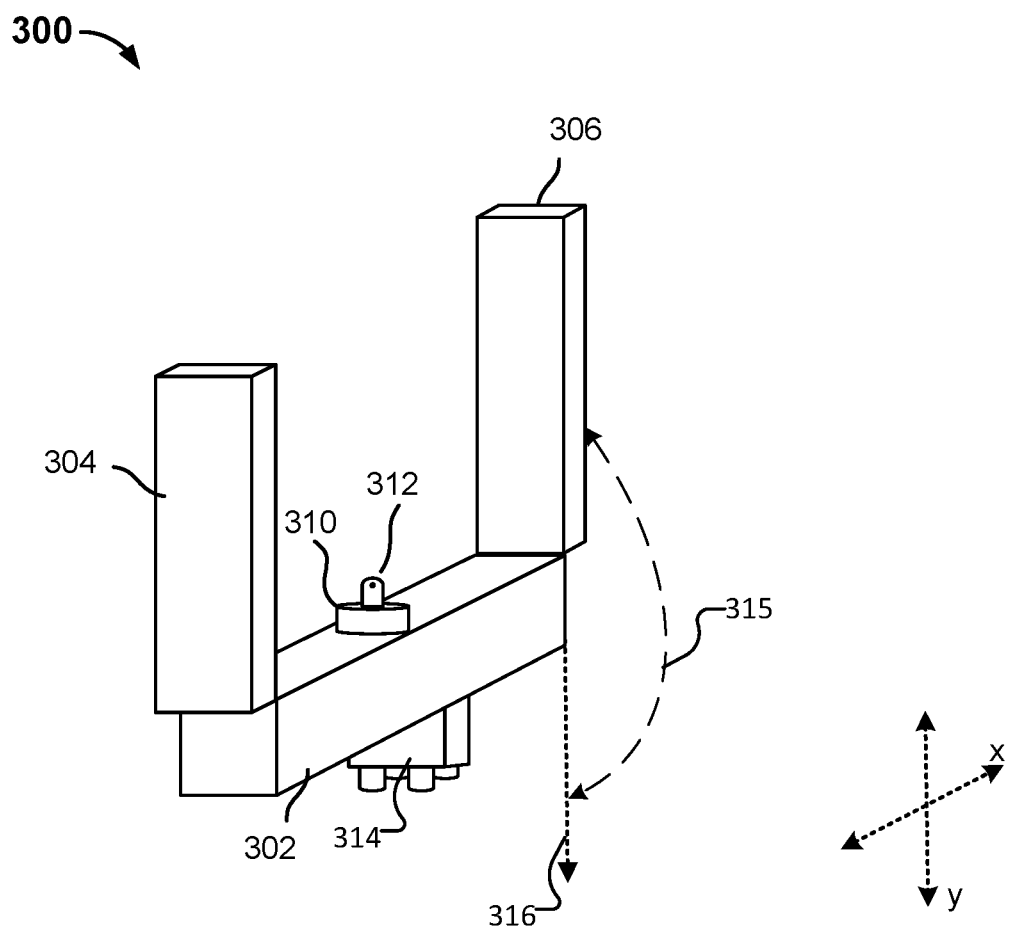
FIG. 3C is a diagram illustrating an embodiment of a robotically controlled tray handling end effector.

FIG. 3C is a diagram illustrating an embodiment of a robotically controlled tray handling end effector. End effector 300 comprises a second grasping mechanism that is controlled (e.g., during the second mode of operation of the multi-mode operation) to grasp items using gripper arms (e.g., side members 304, 306). In some embodiments, end effector 300 is controlled to move one or more of the gripper arms to open a grip to allow end effector 300 to move into position to grasp an object (e.g., a tray) and to move one or more of the gripper arms to close the grip on the object to be grasped.

In some embodiments, during operation of end effector 300 in the first mode, end effector transitioned to the inactive state in which elements (e.g., the gripper arms) are moved to a fully retracted state. As illustrated in FIG. 4C, side members 304,306 are positioned in an active state in which side members 304, 306 are fully retracted and enable suction-based end effector 314 (e.g., the first grasping mechanism such as a suction-based end effector) to grasp an item.

Vector/direction 316 illustrates an example of a closed position (e.g., the closed position threshold) corresponding to end effector 300 being operated in the second mode (e.g., in which the gripper arms are positioned in the active state). In various embodiments, the closed position is a configuration according to which side member 306 forms a normal vector (or substantially a normal vector) relative to lateral member 302 and extends away from a part of lateral member 302 that is mounted to a robotic arm. For example, the closed position threshold is 90 degrees (or substantially 90 degrees) relative to a direction along which lateral member 302 extends. As illustrated in FIG. 3C, side members 304, 306 are moved to an open position (e.g., a retracted state). As side members 304, 306 are moved to the open position, an angle between side member 306 and vector/direction 316 is represented as angle 315. According to various embodiments, the open position threshold corresponds to a configuration at which angle 313 is between 145 degrees and 225 degrees. In some embodiments, open position threshold corresponds to a configuration at which angle 313 is between 180 degrees and 225 degrees.

Figure 4A:
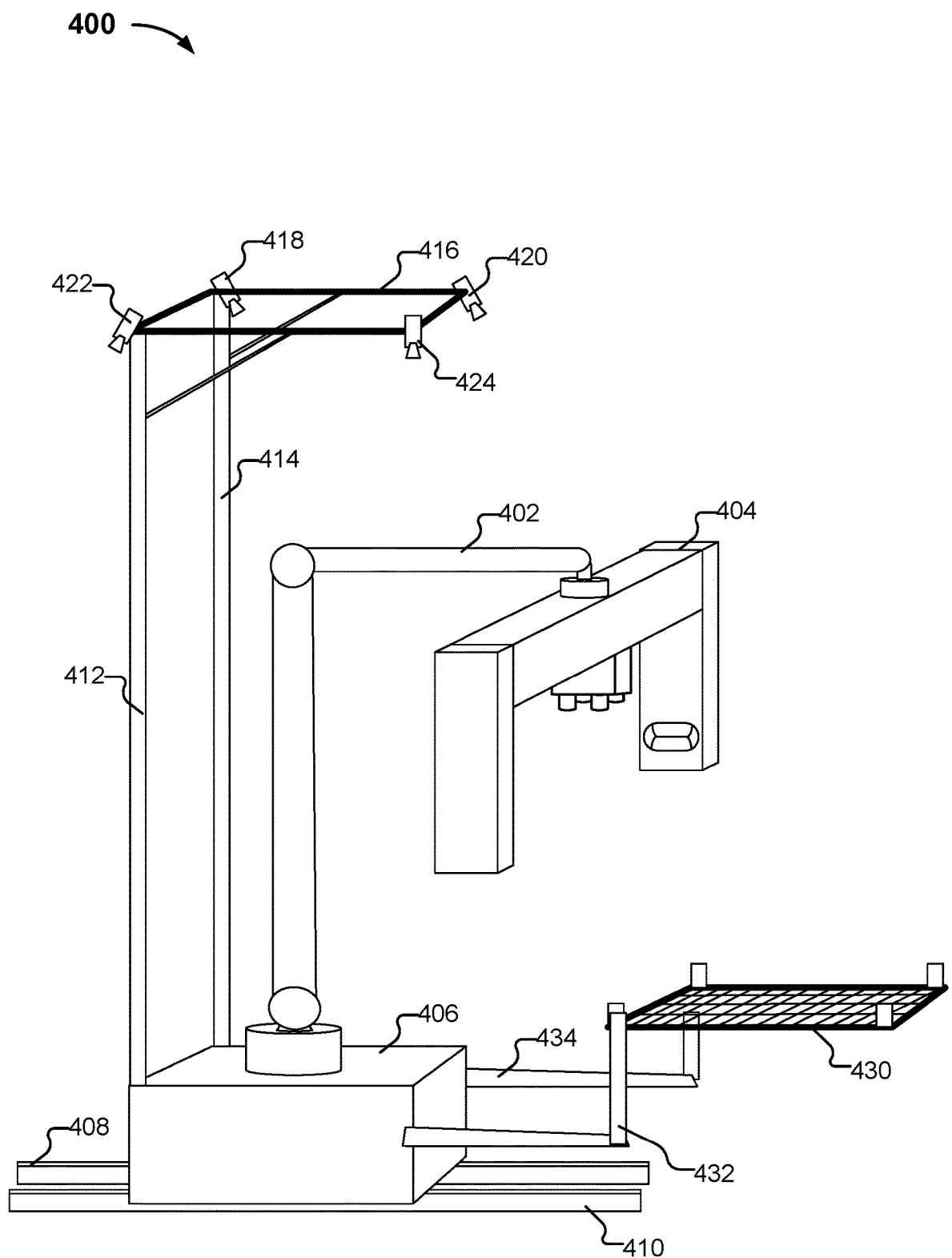
FIG. 4A is a diagram illustrating an embodiment of a robotic system.
Figure 4B:
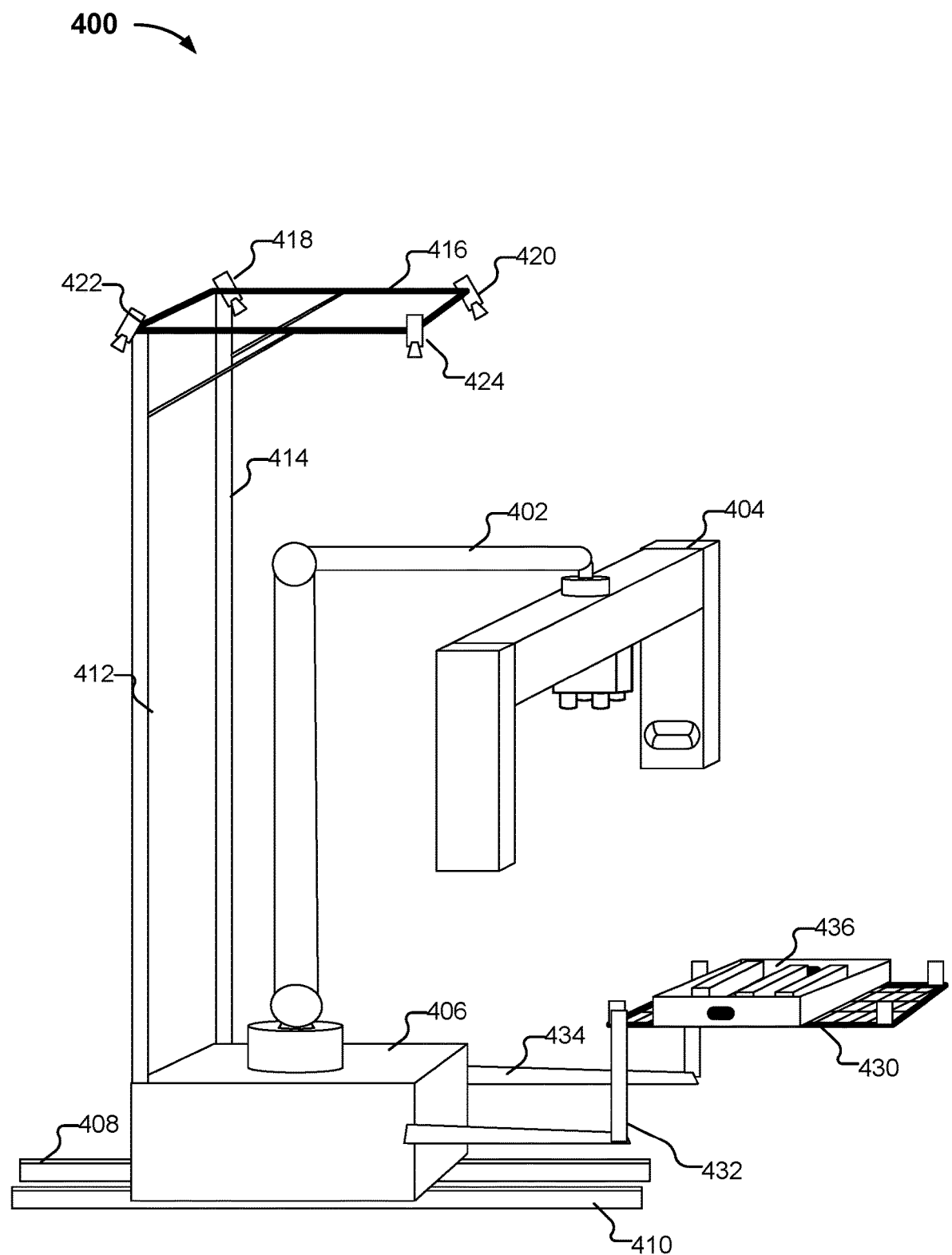
FIG. 4B is a diagram illustrating an embodiment of a robotic system.
Figure 4C:
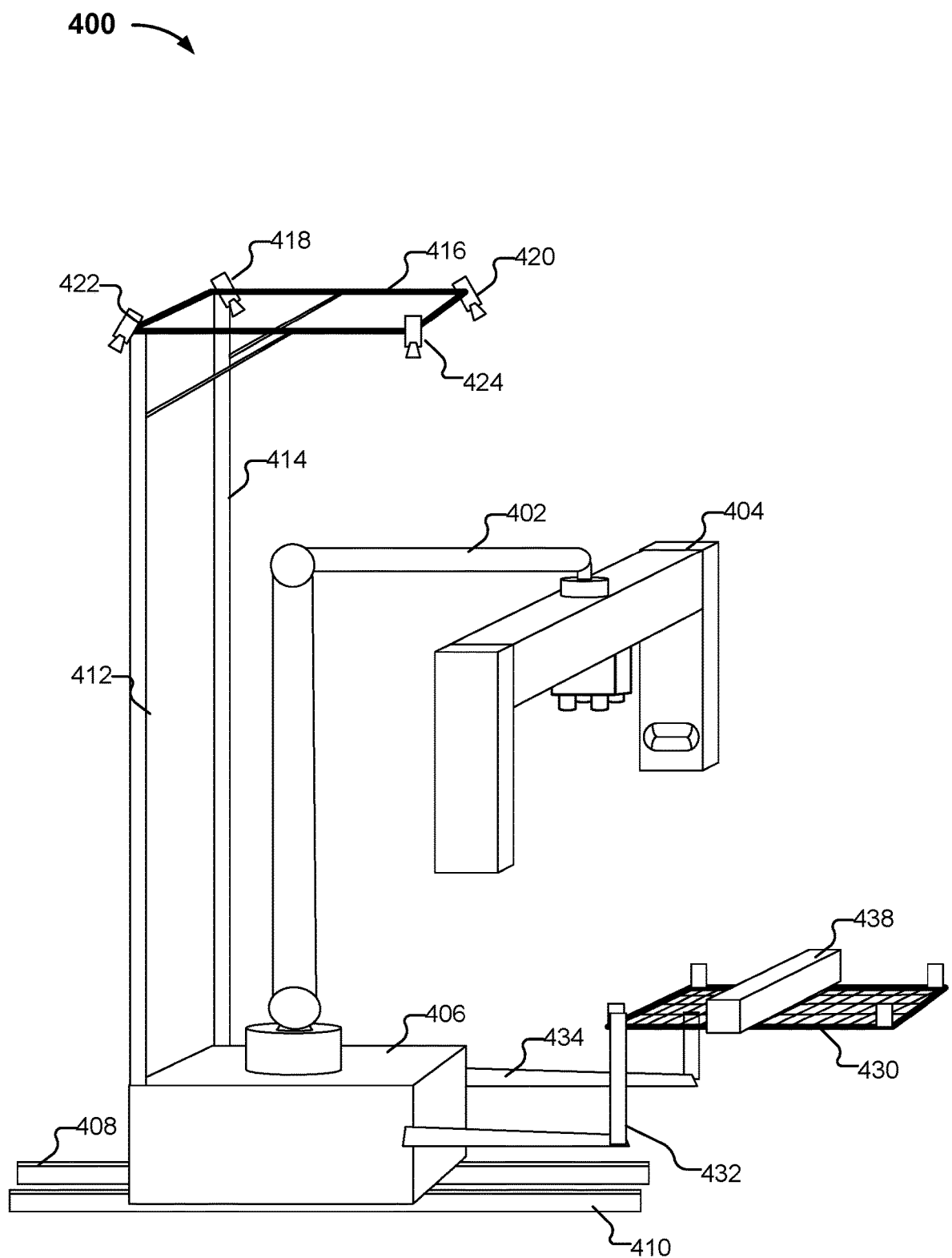
FIG. 4C is a diagram illustrating an embodiment of a robotic system.

FIG. 4A is a diagram illustrating an embodiment of a robotic system. FIG. 4B is a diagram illustrating an embodiment of a robotic system. FIG. 4C is a diagram illustrating an embodiment of a robotic system. Robot 400 implements process 1100 of FIG. 11, process 1200 of FIG. 12, process 1300 of FIG. 13, and/or process 1500 of FIG. 15.

In various embodiments, one or more robots such as robot 400 of FIG. 4A may be included in a robotic tray handling system as disclosed herein, e.g., robotic arms 112, 114 in FIGS. 1A and 1B or other item handling system (e.g., a singulation system, a palletization system, a kitting system, etc.). In the example shown, robot 400 includes a robotic arm 402 and tray handling end effector mounted on a carriage 406 (e.g., a chassis, etc.) configured to be moved under robotic control along rails 408 and 410. In the example shown, robot 400 includes a superstructure comprising vertical supports 412 and 414 and upper frame 416 provides mounting locations for 3D cameras 418, 420, 422, and 424. In various embodiments, one or more 3D cameras are placed near the base of the robot.

In various embodiments, robot 400 is deployed in a tray handling system as shown in FIGS. 1A and 1B or other item handling system. Source tray stacks are provided on one side of rails 408 and 410 (e.g., beyond rail 408 as shown) and destination tray stacks are built on an opposite side of rails 408 and 410 (e.g., on the side of rail 410 nearer the viewer, as shown). Pairs of cameras on the source tray stack side (e.g., 418, 420) and destination tray stack side (e.g., 422, 424) are used to provide a view of relevant portions of the workspace in the vicinity in which the robot 400 is located and working. In some embodiments, one or more cameras capture information pertaining to items or trays placed on task table 430.

In various embodiments, the image data is used to do one or more of the following: avoid collisions with other robots, tray stacks, and other items present in the workspace; plan trajectories; and position the end effector 1304 and/or a tray in the grasp of end effector 1304 in at least an initial position under position control. End effector 1304 is a multi-mode end effector comprising a first grasping mechanism (e.g., a suction-based end effector) and a second grasping mechanism (e.g., an end effector having gripper arms). End effector is robotically controlled to operate in one of a plurality of different operating modes, such as a first mode in which an object is grasped using a suction-based end effector, a second mode in which an object is grasped using an end effector having gripper arms, a third mode in which end effector 1304 is used to push or pull an object such as a stack of trays, a cart, a dolly, etc. Various other modes may be implemented.

In some embodiments, the cameras 418, 420, 422, and 424 are included in a vision system used to control of a robotic tray handling system as disclosed herein. In some embodiments, the vision system is designed to self-calibrate. The robot uses a marker that is installed on one of its joints and exposes the marker to the cameras in the system, e.g., cameras 418, 420, 422, and 424, which recognize the marker and perform a pose estimation to understand their own pose in world coordinates. The robot plans its motion using collision avoidance to get the marker into a position close to the cameras to get a high-quality calibration. In some embodiments, a camera captures information pertaining to a marker on the ground, such as an area beneath task table 430. For example, task table 430 (e.g., table surface) includes one or more cutouts through which a camera can capture information pertaining to a marker on the ground beneath task table 430.

In some embodiments, a onetime manual process follows the automatic calibration to further ensure the quality of the process. A point cloud is overlaid on top of the simulated graphics of the system and a human operator performs the matching or the rendered graphics of the robot plus environment in a simulator to the point cloud as seen by the camera mounted on the robot. Further verification procedures are also in place to verify perceived depth of objects of known heights in the world frame (coordinates).

In some embodiments, a system as disclosed herein self-calibrates its own dimensions. The robot moves up and down the rail to find the pick and place locations and uses force control to find the coordinates of the input-output slots. It dynamically performs an update. For example, in some embodiments, the system uses specially designed calibration motions (including force control) to find the exact locations of each of the input and the output facings (where stacks of trays exist) referred to as the "layout", and updates layout values internally that many times reveal variations such as uneven ground surfaces, peripheral installation misalignments. The robot dynamically performs these updates through its lifespan, in various embodiments.

In some embodiments, the vision system approximates the pose of the target tray or the target destination stack to check the robot goal motions. A vision system scheduler guarantees simultaneous checks when it is possible to and both input and output targets are in the field of view.

In the example shown, robot 400 comprises task table 430. As illustrated, task table 430 is connected/mounted to carriage 406. However, task table 430 may additionally or alternatively be connected/mounted to robotic arm 402. Task table 430 is fixedly mounted such that a location of task table 430 relative to robot 400 remains static during operation of robot 400. In some embodiments, the location of task table 430 relative to robot 400 corresponds to a location/area according to which robot 400 can pick/place items to/from task table 430 with relative ease. For example, task table 430 is located within a range of robotic arm 402 (e.g., end effector 404). In some embodiments, task table 430 is mounted in a location at which robotic arm 402 is able to move its end effector 404 with relative ease. For example, task table 430 is located at a position according to which when robotic arm 402 is picking/placing an item to/from task table 430, the robotic arm is in an efficient pose (e.g., the robotic arm is not in an awkward pose, or one or more joint angles of the robotic arm are not in sub-optimal/inefficient positions). Because task table 430 is disposed at a static position relative to the robotic arm (e.g., a base of the robotic arm or a carriage on which the robotic arm is mounted), the system uses a predefined/optimized routine for moving end effector 404 of the robotic arm 402 to/from task table 430. In some embodiments, task table 430 is mounted in a position in which robotic arm 402 is able to reliably pick/place items (e.g., a robotic arm has an expected successful placement rate exceeding a predefined placement rate threshold).

In some embodiments, end effector 404 is a multi-mode end effector similar to the end effector shown in the example. For example, end effector 404 comprises a first grasping mechanism (e.g., a suction-based end effector) and a second grasping mechanism (e.g., a plurality of gripper arms). Robot 400 is controlled to use the first grasping mechanism to Task table 430 is mounted to carriage 406 or robotic arm 402 using one or more support structures such as boom 432 and/or boom 434. The support structures position task table 430 at a sufficient height to provide clearance from objects (e.g., objects on the ground, rails 408, 410) within the workspace and to position task table 430 in an area of the workspace within which robotic arm 402 accesses with relative ease/efficiency. Booms 432, 434 are made of steel, aluminum, or such other material that provides sufficient rigidity/strength to support task table 430 and a minimum cantilever load placed on task table 430.

Task table 430 is sufficiently large to accommodate a receptacle (e.g., a standard tray/stackable tray) or a predefined number of items of a predefined size. Task table is configured to securely hold the receptacle or item(s) during operation of robot 400. In some embodiments, the one or more structures used to mount the task table 430 to carriage 406 or robotic arm 402 are sufficiently strong/rigid to eliminate vibrations of task table 430 or items thereon during operation of robot 400 (e.g., during movement of robotic arm 402 to pick/place items or during movement of carriage 406 to position robotic arm 402 in different location within workspace) or to reduce vibrations to be less than a predefined vibration threshold.

In the example shown in FIG. 4B, a tray 436 may be placed on task table 430. Task table 430 is sufficiently strong/rigid to support at least one tray comprising a plurality of items. Task table 430 enables the system to increase its efficiency in decision-making (e.g., having a predefined location to pick/place items), increases the range of product volumes the system can process, and increase the throughput and efficacy for the system to pick and place items. As illustrated, task table 430 is mounted in a location at which an inner volume of a receptacle (e.g., a tray) placed on the task table is within the reach of the robotic arm. For example, the inner volume of the receptacle is expected to be in the reachable region for the robotic arm or otherwise at which a location at which the robotic arm is able to reliably pick/place items (e.g., a robotic arm has an expected successful placement rate exceeding a predefined placement rate threshold).

The system uses task table 430 as a location at which a receptacle (e.g., tray 436) is maintained during loading/unloading the receptacle. For example, the system uses task table 430 to support tray 436 during a loading of tray 436 with one or more items, or during an unloading of an item(s) from tray 436.

In the example shown in FIG. 4C, the system (e.g., robot 400) uses task table 430 as a buffer area (e.g., a staging) to store one or more items (e.g., item 438) while moving other items in the workspace. For example, if a set of N items are to be moved (e.g., singulated, palletized/depalletized, kitted), the system uses task table 430 as an area at which to place/store a subset of the N items while another subset of the N items is moved. An illustrative example includes in the case of palletizing a set of N items, the system determines a stacking order in which the set of N items are to be placed on a stack, and the order in which the set of N items are delivered to the workspace/robot (e.g., on a conveyor, etc.) are different from the stacking order. Accordingly, the system uses task table 430 as a buffer or staging area for a subset of the N items to allow the system to stack the set of N items in the proper/predefined order (e.g., an order that is expected to result in an ideal stack of items, such as a stable stack, a stack having a lowest cost according to a predefined cost threshold, etc.). As an example, if the system is to stack the set of N items including a small item and one or more larger items and the small item is delivered to the workspace and the system determines that one or more larger items are to be delivered shortly thereafter (e.g., within a set of N next items), the system places the small item on task table 430 and proceeds to place the one or more larger items on the stack before retrieving the small item from the task table and placing the small item on the stack. The placement of relatively larger items on the stack before the small item may allow for a more stable stack to be generated.

In some embodiments, the system generates a plan for picking and placing a plurality of items. The system uses a mode of the workspace in connection with generating the plan. The model of the workspace for robot 400 include task table 430. For example, buffering/staging a tray or a subset of the plurality of items on task table 430 is included in the solution space for controlling robot 400 to pick and place the plurality of items. Accordingly, the system determines an optimal or lowest cost placement/order for placing the item. The system deems the optimal or lowest cost placement/order to be a placement/order that satisfies a cost criteria (e.g., the placement/order has a cost less than a predefined cost threshold). The system includes one or more other constraints for determining the placement/order to implement, such as a fastest completion time, a stability criteria for placement of the item(s), a latency for determining a set of possible placements/orders (e.g., a first placement/order identified as a solution that satisfies the selection criteria such as the cost criteria and/or one or more other constraints).

According to various embodiments, the system determines a plan to perform a high-level operation. For example, the system determines the plan to perform the high-level operation based at least in part on an order, a manifest, a packing slip, etc. The high-level operation includes a kitting operation (e.g., assembling/packaging a kit of items), a singulation operation, and/or a palletization operation. In the context of determining and implementing a plan for a kitting operation, the system determines a plan to assemble a kit by retrieving a manifest or other list of items each in corresponding quantity and packing them in a box, stacking them on a pallet, putting them on a conveyor or other egress/output device, etc. The plan includes putting a box/pallet on a task table (e.g., an integrated/affixed table) and filling the box/pallet from various bins or other destination locations, etc., or grabbing a selected subset of items placing the items on tray (e.g., the tray on the table surface of the task table) as the robot moves within the workspace (e.g., traverses a rail(s)), then taking them (on tray) to a destination and pick/placing from tray, then getting the next subset of items. For example, the plan includes controlling the robot to grab items in a little circuit or loop, as robot passes bins or shelves etc. within the workspace, then make another pass.

In some embodiments, the plan for performing the high-level operation is determined based at least in part on the set of items to be picked/placed (e.g., based on an order, manifest, packing slip) and locations of each of the items within the workspace. The plan may be further determined based on an order in which the items are to be placed in receptacle (e.g., box, tray, etc.), such as for optimizing space utilization in the receptacle. The system determines the plan to optimize the performing the high-level operation, such as to minimize (or reduce below a predefined threshold) an amount of time to perform the high-level operation, to minimize a number of traversals or movement of the robot within the workspace, etc. The determining the plan for performing the high-level operation includes determining an order in which items are to be packed (or de-packed) from a receptacle, such as based on attributes of the items (e.g., a size of the item(s), a weight of the item(s), a rigidity/compressibility of the item(s)). For example, the system determines a plan based on a global optimization for performing the high-level operation by planning an efficient number of trips and pick/place operations, etc. In response to determining the plan for performing the high-level operation, the system determines individual lower-level plans for performing a pick/place operation with respect to a particular item(s), including determining a strategy for grasping the item(s), moving a robot arm, etc.

Figure 5:
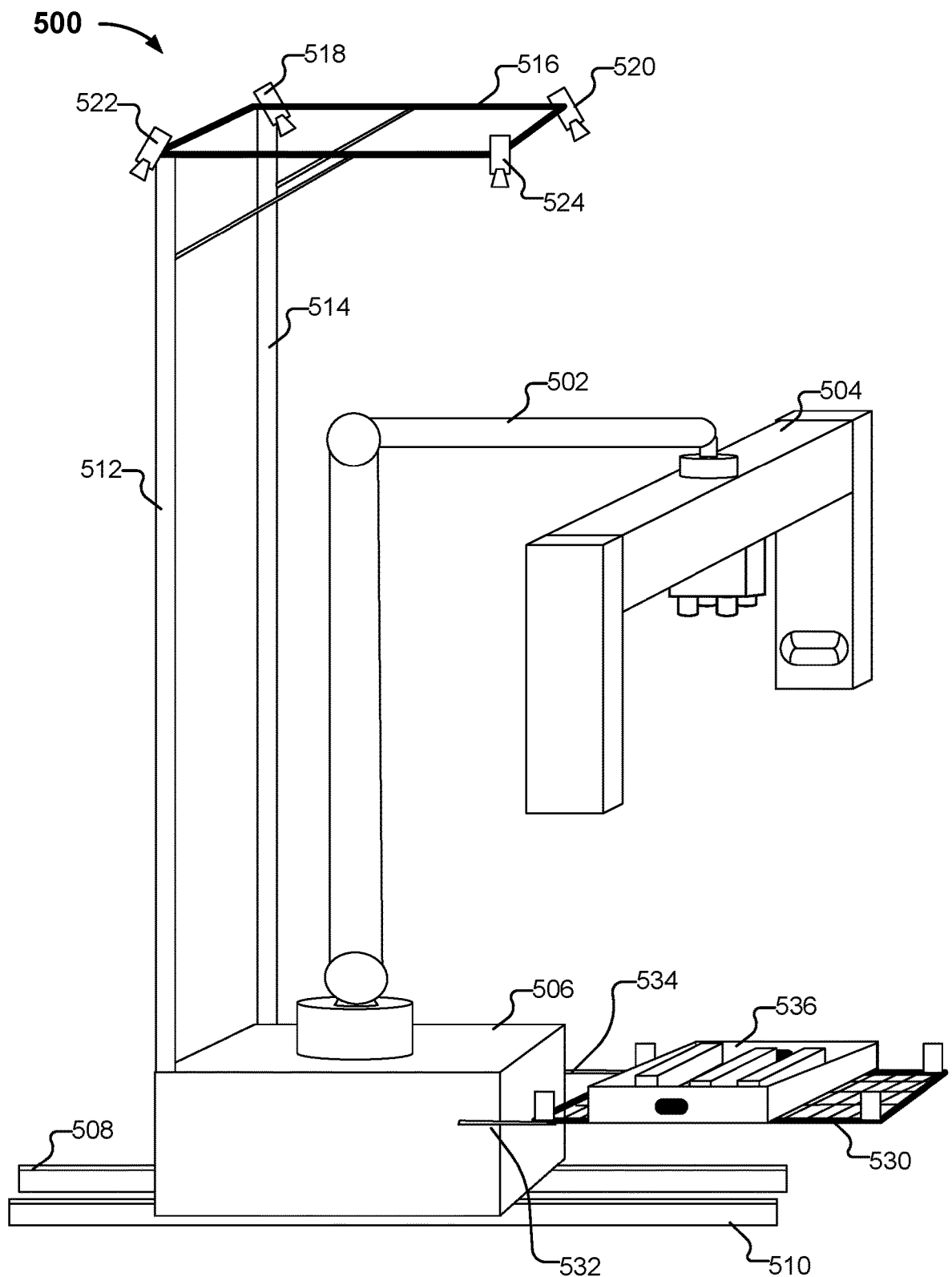
FIG. 5 is a diagram illustrating an embodiment of a robotic system.

FIG. 5 is a diagram illustrating an embodiment of a robotic system. Robot 500 implements process 1100 of FIG. 11, process 1200 of FIG. 12, process 1300 of FIG. 13, and/or process 1500 of FIG. 15.

In various embodiments, one or more robots such as robot 500 of FIG. 5 are included in a robotic tray handling system as disclosed herein, e.g., robotic arms 112, 114 in FIGS. 1A and 1B or other item handling system (e.g., a singulation system, a palletization system, a kitting system, etc.). In the example shown, robot 500 includes a robotic arm 502 and end effector 504 (e.g., a tray handling end effector) mounted on a carriage 506 (e.g., a chassis, etc.) configured to be moved under robotic control along rails 508 and 510. In the example shown, robot 500 includes a superstructure comprising vertical supports 512 and 514 and upper frame 516 provides mounting locations for 3D cameras 518, 520, 522, and 524. In various embodiments, one or more 3D cameras are placed near the base of the robot.

Robot 500 comprises task table 530 mounted to carriage 506. In the example shown, robot 500 includes a task table 530 that is mounted to carriage 506 via one or more support structures (e.g., booms 532, 534). The support structures (e.g., booms 532, 534) that mount task table 530 horizontally extend task table 530 from the base of carriage 506. In contrast, to booms 432, 434 of robot 400, the support structures mounting task table 530 provide less/no additional height clearance. In some embodiments, robot 500 includes an additional support structure (e.g., a strut) that is configured to provide additional support to task table 530. The additional support structure provides support (e.g., be connected to task table 530) at a location that is at the mid-point of task table 530 or a location closer to carriage than the midpoint of task table 530.

Figure 6:
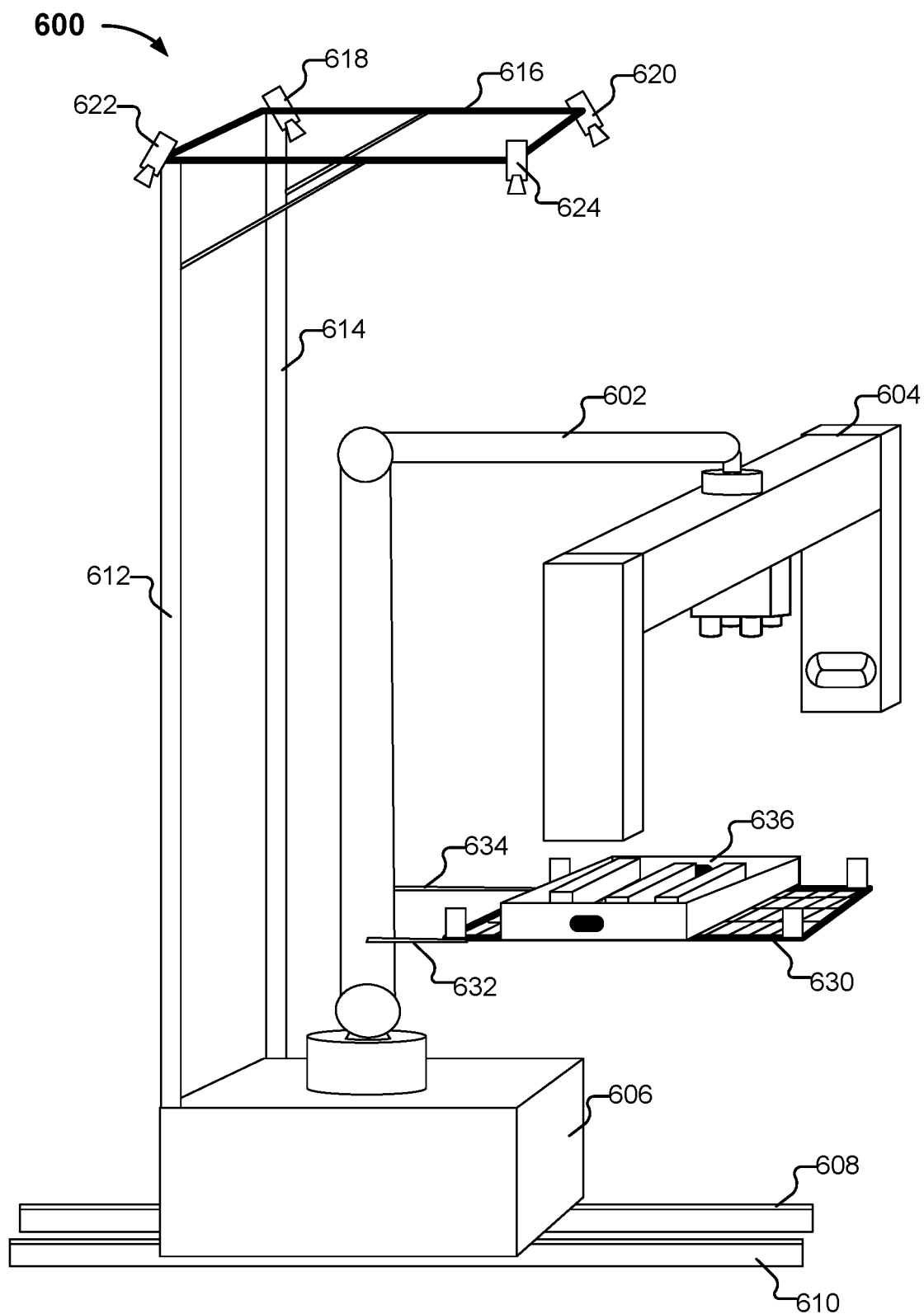
FIG. 6 is a diagram illustrating an embodiment of a robotic system.

FIG. 6 is a diagram illustrating an embodiment of a robotic system. Robot 600 implements process 1100 of FIG. 11, process 1200 of FIG. 12, process 1300 of FIG. 13, and/or process 1500 of FIG. 15.

In various embodiments, one or more robots such as robot 600 of FIG. 6 are included in a robotic tray handling system as disclosed herein, e.g., robotic arms 112, 114 in FIGS. 1A and 1B or other item handling system (e.g., a singulation system, a palletization system, a kitting system, etc.). In the example shown, robot 600 includes a robotic arm 602 and end effector 504 (e.g., a tray handling end effector) mounted on a carriage 606 (e.g., a chassis, etc.) configured to be moved under robotic control along rails 608 and 610. In the example shown, robot 600 includes a superstructure comprising vertical supports 612 and 614 and upper frame 616 provides mounting locations for 3D cameras 618, 620, 622, and 624. In various embodiments, one or more 3D cameras are placed near the base of the robot.

Robot 600 comprises task table 630 mounted to carriage 606. In the example shown, robot 600 includes a task table 630 that is mounted to robotic arm 602 via one or more support structures (e.g., booms 632, 534). The support structures (e.g., booms 632, 634) that mount task table 630 horizontally extend task table 630 from the base of carriage 606. In some embodiments, robot 600 includes an additional support structure (e.g., a strut) that is configured to provide additional support to task table 630. The additional support structure provide support (e.g., be connected to task table 630) at a location that is at the mid-point of task table 630 or a location closer to carriage than the midpoint of task table 630. In some embodiments, robot 600 comprises a task table 630 mounted to robotic arm 602 and an additional support structure (e.g., a strut) mounted to carriage 606.

Although FIGS. 4-6 illustrate the task table being mounted to the carriage or robotic arm, the task table is fixedly mounted to other parts of the robot. For example, in some embodiments, the task table is mounted to the super structure (e.g., the super structure comprising vertical supports 612, 614 of FIG. 6).

Figure 7A:
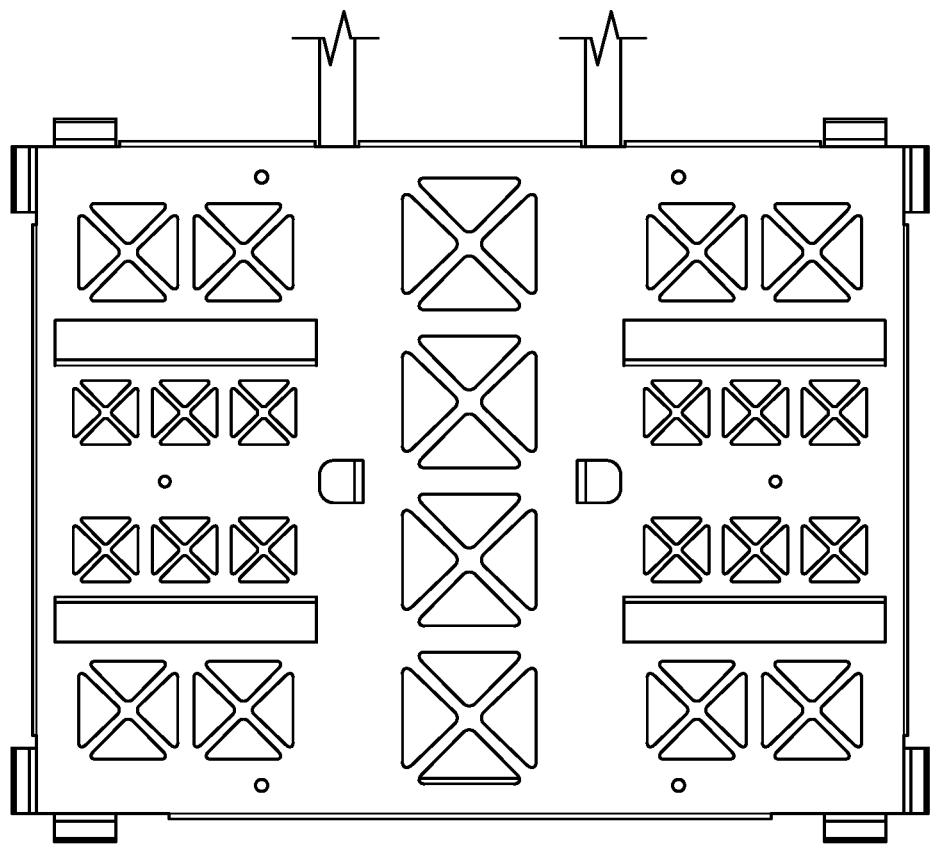
FIG. 7A is a diagram illustrating an embodiment of a task table.

FIG. 7A is a diagram illustrating an embodiment of a task table. In the example shown a top view of task table 700 is provided. As illustrated, task table 700 comprises one or more cutouts (e.g., cutouts 702, 704, 706, 708). The one or more cutouts improve the weight of task table 700. According to various embodiments, task table 700 is configured to be sufficiently rigid/strong to support one or more trays or items (e.g., to support a predefined weight threshold) while remaining lightweight to improve the efficiency of moving the robot, to which task table 700 is mounted, throughout the robot's workspace. The one or more cutouts comprised in task table 700 are configured according to a predefined pattern. As example, the predefined pattern is configured (e.g., designed) to provide support in certain areas of task table 700 while other areas of task table 700 comprise the cutout(s). As an example, in the case of deployment of a task table in a kitting system in which a robot is controlled to pack or unload a set of trays, the task table is configured to include cutouts in areas at which the tray is not located (e.g., peripheral areas of the tray) and/or at parts of the task table corresponding to the middle or interior of the surface of the tray that is resting on the task table. Placement of the cutouts is configured to ensure that the peripheral area of the tray surface resting on the task table is supported by a surface of the task table, while cutouts are placed in other areas. Task table 700 is supported by one or more support structures (e.g., booms 732, 734).

Figure 7B:
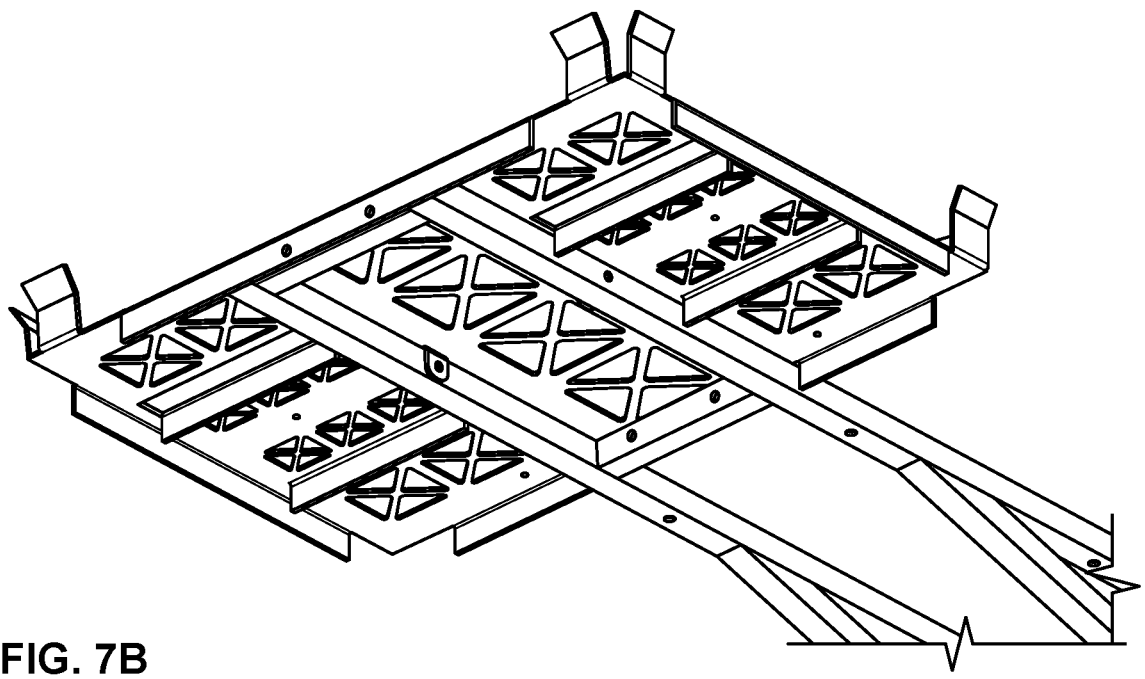
FIG. 7B is a diagram illustrating an embodiment of a task table.

FIG. 7B is a diagram illustrating an embodiment of a task table. In the example shown a bottom view of task table 700 is provided. As illustrated, task table 700 comprises additional structures to support task table 700 (e.g., to provide support for a cantilever load placed on task table 700). For example, task table 700 comprises one or more flanges (e.g., flanges 742, 744, 746, and 748). The one or more additional support structures are configured to extend an entire length or width of task table 700 or part of the length or width of task table 700. For example, as illustrated, flanges 742, 744, 746, and 748 extend part of a width of task table 700. Flanges 742, 744, 746, and/or 748 extend from an edge of task table 700 to where task table 700 is supported by booms 732, 734. Accordingly, flanges 742, 744, 746, and 748 provide additional support for the areas of task table 700 between the edge of task table 700 and booms 732, 734.

Figure 8:
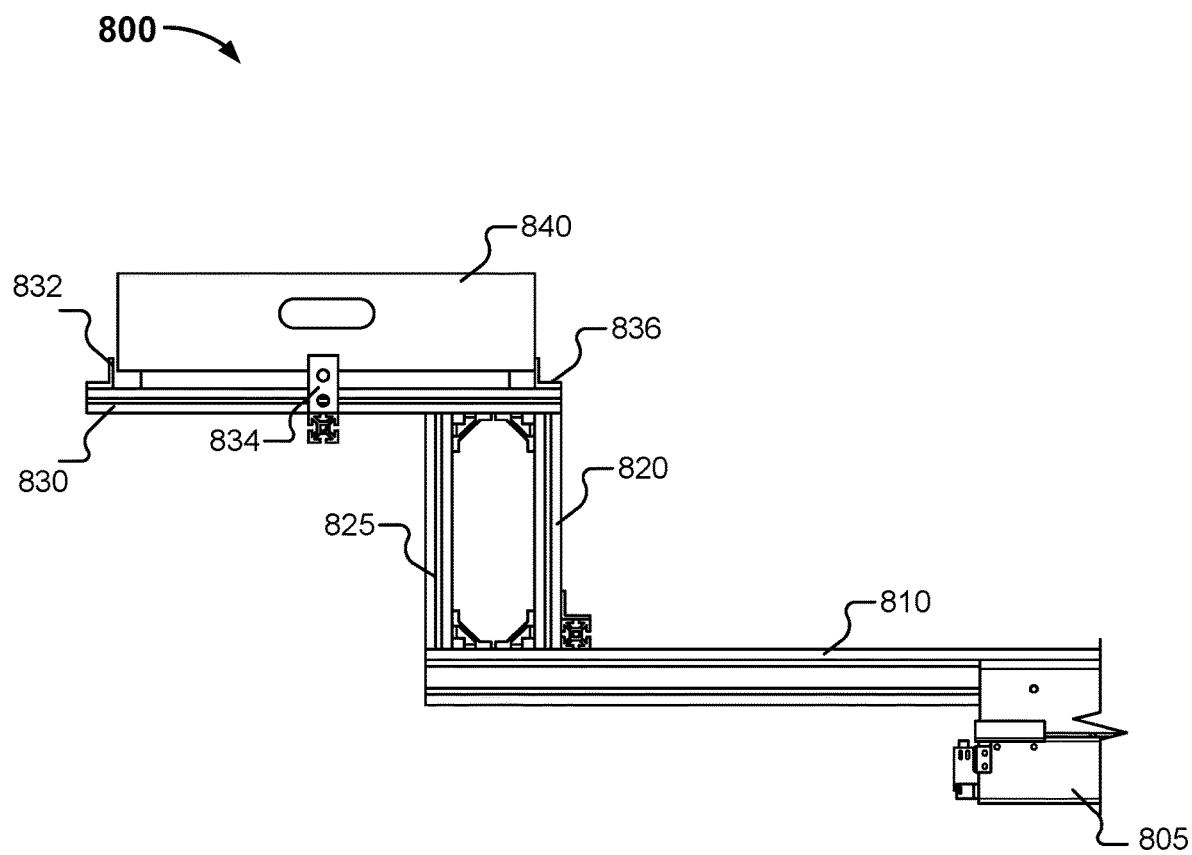
FIG. 8 is a diagram illustrating an embodiment of a task table.

FIG. 8 is a diagram illustrating an embodiment of a task table. In the example shown a side view of task table 800 is provided. As illustrated, task table 800 is mounted to carriage 805 in a manner that task table 800 has a certain clearance with respect to the ground, the rails on which carriage 805 traverses, or other obstacles or objects within the workspace. Task table 800 is mechanically rigid to minimize vibrations (e.g., attenuate or otherwise reduce vibrations to below a predefined vibrations threshold) during carriage movement and buffer operations. In some embodiments, rigidity is provided by using secure fasteners and rigid materials, such as steel struts.

Task table 800 is mounted to carriage 804 by boom(s) 810, which are made of a rigid/strong material such as a metal (e.g., steel, aluminum, stainless steel, etc.). Task table 800 is further supported by support structures 820 and 825, which are connected to booms 810. Support structures 820, 825 provide additional clearance for task table 800 (e.g., additional clearance as compared with a height of boom(s) 810). In some embodiments, surface 830 of task table 800 is configured (e.g., sized, shaped, etc.) based at least in part on a size of a tray used within the system within which the robot is deployed (e.g., a standard tray size or another predefined tray size). Task table 800 is configured to support one or more trays such as tray 840. Additional trays may be stacked on top of tray 840.

In some embodiments, task table 830 has a plurality of tabs 832, 834, 836, etc. that are configured to provide lateral support to an item or tray 840 placed on task table 800. For example, tabs 832, 834, and 836 are configured to prevent tray 840 from falling from task table 800. Tabs 832, 834, and 836 are sufficiently rigid/strong to withstand lateral forces applied by tray 840 during movement of the robot to which task table 800 is mounted.

Figure 9:
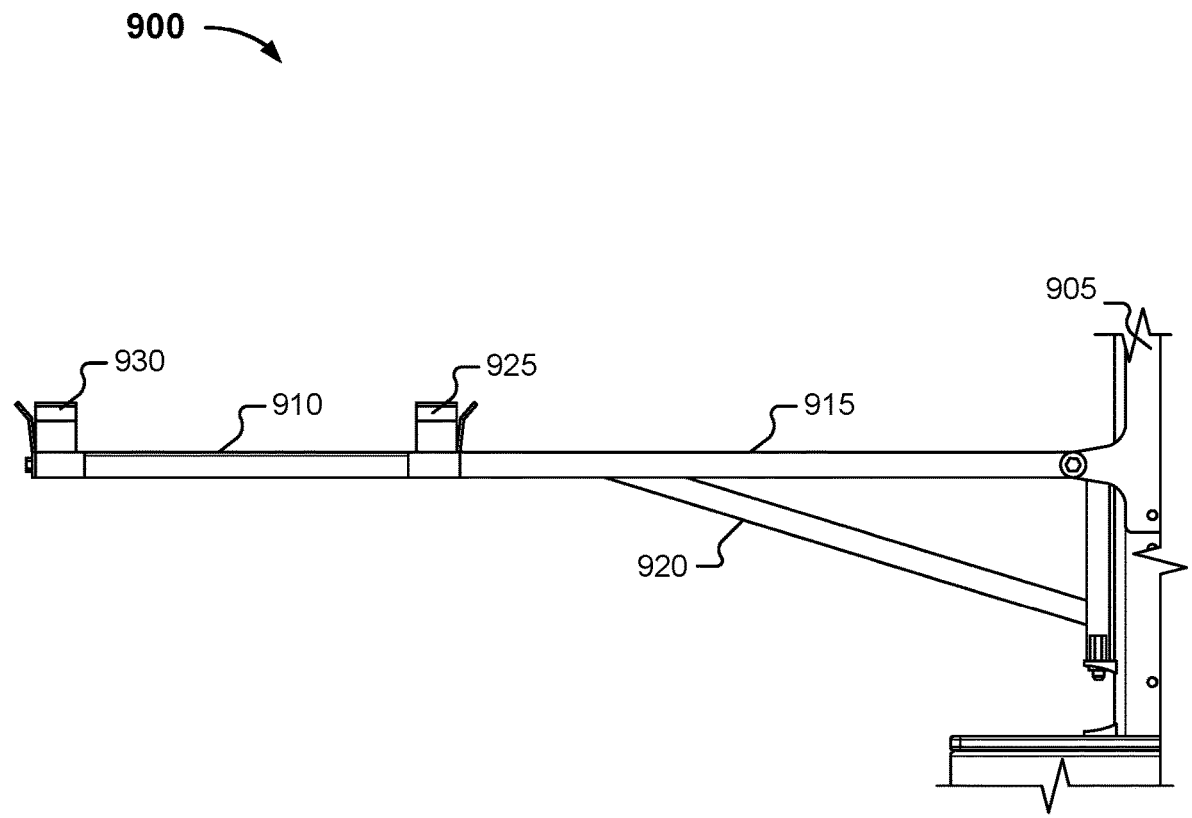
FIG. 9 is a diagram illustrating an embodiment of a task table.

FIG. 9 is a diagram illustrating an embodiment of a task table. In the example shown a side view of task table 900 is provided. In some embodiments, task table 900 is supported by cantilever support 920 that provide additional support for task table 900 to enable task table 900 to carry larger loads (e.g., more or heavier trays, etc.) or to enable boom(s) 915 to be designed to be more lightweight (e.g., one or more dimensions may be chosen, a lighter material may be used, etc.).

As illustrated, task table 900 comprises a table surface 910 that is mounted to carriage 905 via boom(s) 915. Support for table surface 910 is improved by using cantilever support 920 (e.g., a strut) that is mounted to carriage 905 table surface 910 or boom(s) 915. As an example, cantilever support 920 is configured to be connected to table surface 910 or boom(s) 915 at a midpoint between the carriage or robotic arm and a far edge of table surface 910. Cantilever support 920 is positioned at a point past the midpoint between the carriage or robotic arm and a far edge of table surface 910, or at a point closer than the midpoint.

In some embodiments, a positioning of cantilever support 920 is configured based on a desired clearance for task table 900 with respect to the ground or other obstacles in the workspace. For example, cantilever support 920 is positioned to support a bottom of table surface 910 or boom(s) 915 at the midpoint between the carriage or robotic arm and a far edge of table surface 910 or a location closer to the carriage or robotic arm than the midpoint.

Task table 900 further comprises a plurality of tabs or lateral supports, such as tabs 925, 930. The plurality of tabs is positioned around a perimeter of an area of table surface 910 at which an item(s) or tray(s) is to be placed. In some embodiments, the plurality of tabs is positioned based on a size of tray, etc. In the example shown, the locations of tabs 925, 930 correspond to corners of the area in which a tray is to be placed on task table 900.

Figure 10A:
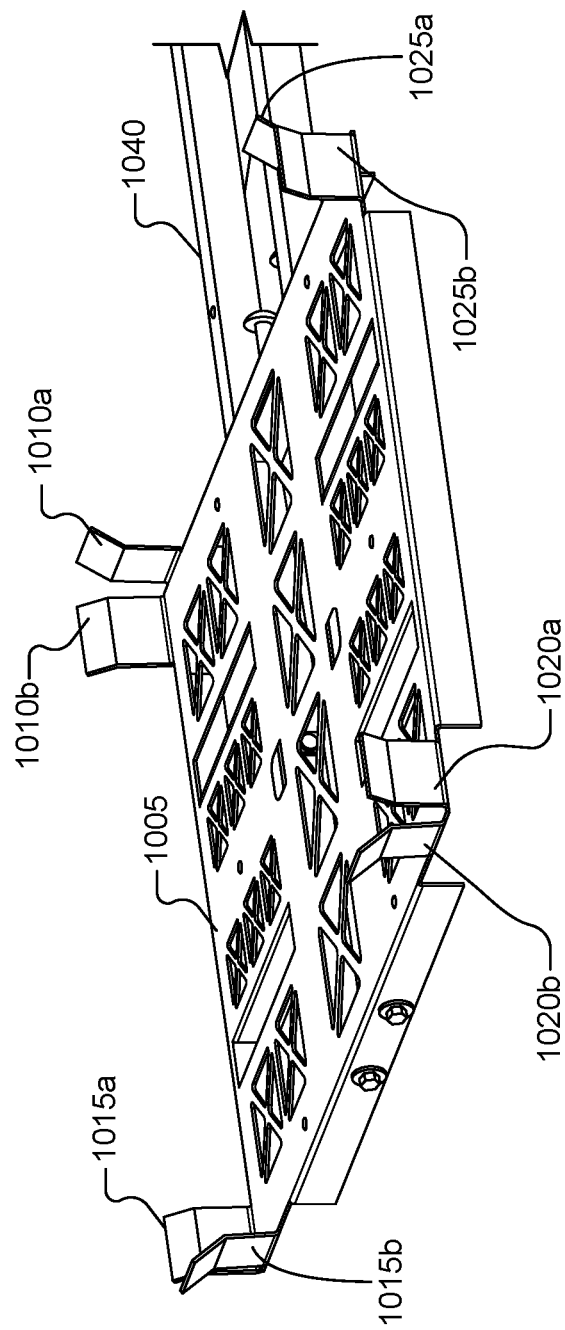
FIG. 10A is a diagram illustrating an embodiment of a task table.

FIG. 10A is a diagram illustrating an embodiment of a task table. In the example shown a perspective view of task table 1000 is provided. In some embodiments, task table 1000 comprises a plurality of tabs or lateral support that assist in guiding placement of an item or tray to table surface 1005 or provide lateral support to prevent the item or tray from falling from table surface 1005 such as during movement of the robot.

As illustrated, task table 1000 comprises table surface 1005 mounted to a carriage via a structural support such as boom(s) 1040. Task table 1000 further comprises tabs 1010a, 1010b at a first corner of table surface 1005, tabs 1015a, 1015b at a second corner of table surface 1005, tabs 1020a, 102b at a third corner of table surface 1005, and tabs 1025a, 1025b at a fourth corner. In some embodiments, task table 1000 comprises additional tabs or lateral support around the perimeter of table surface 1005.

The tabs or lateral supports are configured to funnel or guide a tray to the appropriate position on table surface 1005 during placement operations. For example, the tabs or lateral supports are angled in towards a center area of table surface 1005 so as to guide a tray to an appropriate position if the robotic arm has not perfectly aligned the tray with an area of table surface 1005 at which the tray is to be placed. For example, the tabs or lateral supports are sized and/or shaped to account for latent tolerances of physical systems.

Figure 10B:
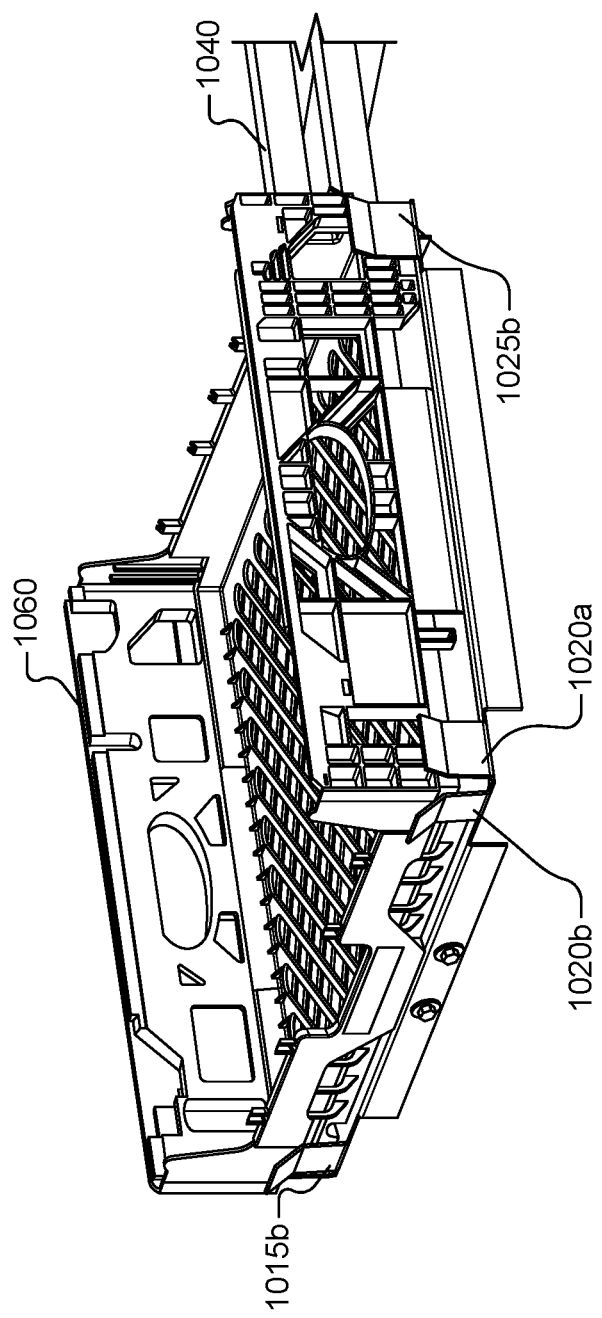
FIG. 10B is a diagram illustrating an embodiment of a task table.

FIG. 10B is a diagram illustrating an embodiment of a task table. In the example shown, task table 1000 is supporting tray 1060. As illustrated, the tabs or lateral supports at the corners of table surface 1005 provide support for tray 1060 (e.g., the corners of tray 1060). Task table 1000 is able to securely hold tray 1060 without losing the ability to place additional trays on top of the existing trays (e.g., tray 1060 may be a stackable tray). Task table 1000 is configured to hold tray 1060 steady while the robot translates along a 7th axis. The 7th axis may correspond to a linear rail along which the carriage traverses to move the robot within the workspace.

Figure 11:
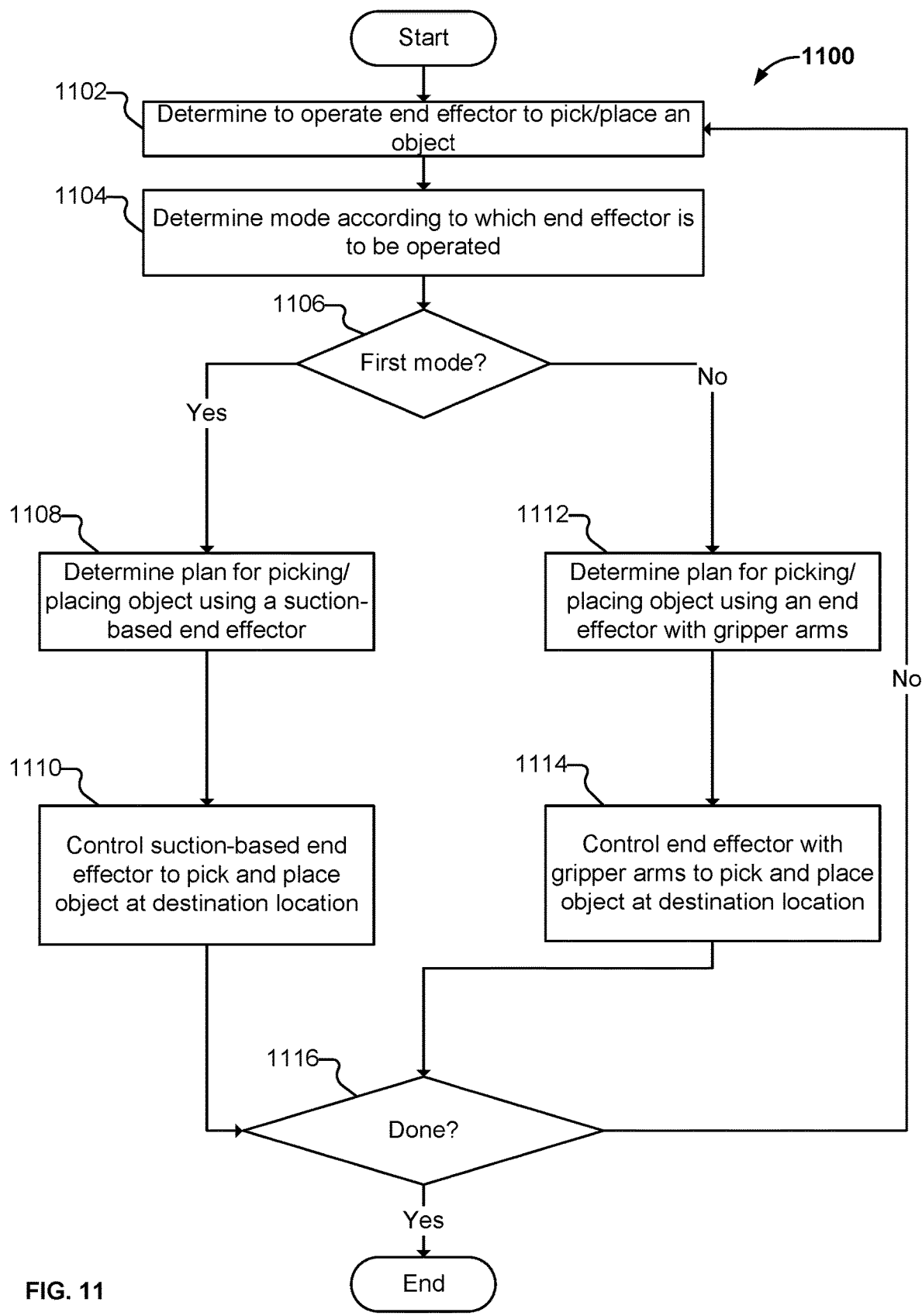
FIG. 11 is a flow diagram of a process for operating an end effector to move an object according to various embodiments.

FIG. 11 is a flow diagram of a process for operating an end effector to move an object according to various embodiments. In some embodiments, process 400 is implemented in connection with controlling end effector 300 of FIGS. 3A-3B. In some embodiments, process 400 is implemented by system 100 of FIG. 1A, etc.

At 1102, a determination is made to operate the end effector (e.g., a multi-mode end effector) to pick/place an object. In some embodiments, an object may be a tray, a receptacle, a tote, a box, an item (e.g., an item that can be included in a tray), etc.

At 1104, a mode according to which the end effector is to be operated is determined. The system selects, from a plurality of modes, the mode according to which the end effector is to be operated. In some embodiments, the system determines whether to operate the end effector in a first mode according to which a first grasping mechanism (e.g., a suction-based end effector) is used to grasp the object, and/or whether to operate the end effector in a second mode according to which a second grasping mechanism (e.g., an end effector comprising a plurality of gripper arms) is used to grasp the object.

At 1106, a determination is made as to whether the end effector is to be operated is the first mode. In response to determining that the end effector is to be operated in the first mode at 1106, process 1100 proceeds to 1108. Conversely, in response to determining that the end effector is not to be operated in the first mode at 1106, process 1100 proceeds to 1112.

At 1108, a plan for picking/placing an object using a suction-based end effector is determined. In response to determining to operate the end effector in the first mode, the system determines a plan (or strategy) for grasping the object such as an item comprised in a tray or other receptacle and for placing the object at a destination location (e.g., a tray, a conveyor, a shelf, etc.). In some embodiments, in response to determining to operate the end effector in the first mode, the system controls the end effector to transition the second grasping mechanism to an inactive state (e.g., in which the gripper arms are moved to a retracted position). The plan determined for grasping the object can include an operation to transition the second grasping mechanism to the inactive state.

At 1110, the suction-based end effector is controlled to pick and place an object at a destination location. The system controls the suction-based end effector to actuate a suction mechanism to apply a suction force between a suction cup of the suction-based end effector and the object to be grasped. The system controls the suction mechanism based at least in part on feedback received by a sensor that detects a suction force (or other attribute of the suction between the suction cup and the object). In some embodiments, controlling the suction-based end effector to pick and place the object comprises controlling a robotic arm to which a multi-mode end effector is mounted to use a suction-based end effector thereof to pick and place the object.

At 1112, a plan for picking/placing the object using an end effector comprising gripper arms is determined. In response to determining to operate the end effector in the second mode, the system determines a plan (or strategy) for grasping the object such as a tray (e.g., a tray comprised in a stack of trays, etc.). In some embodiments, in response to determining to operate the end effector in the second mode, the system controls the end effector to transition the second grasping mechanism to an active state (e.g., in which the gripper arms are moved to a deployed position). The plan determined for grasping the object can include an operation to transition the second grasping mechanism to the active state.

At 1114, the end effector comprising gripper arms is controlled to pick and place an object at a destination location. The system controls the end effector comprising gripper arms (e.g., the second grasping mechanism) to actuate movement of one or mor more of the gripper arms to grip the object (e.g., the tray) to be grasped. For example, the system controls to move an active side member to engage the object. The system controls the end effector comprising gripper arms based at least in part on feedback received by a sensor that detects positioning of one or more gripper arms (or thumbs of such arms) relative to the object to be grasped. In some embodiments, controlling the end effector comprising gripper arms to pick and place the object comprises controlling a robotic arm to which a multi-mode end effector is mounted to use the gripper arms thereof to grasp, and pick/place the object.

At 1116, a determination is made as to whether process 1100 is complete. In some embodiments, process 1100 is determined to be complete in response to a determination that no further objects (e.g., trays, items) are to be moved, a tray held by a task table is empty (e.g., in the case of an unloading operation), a tray held by a task table is full (e.g., int eh case of a loading operation), a user has exited the system, an administrator indicates that process 1100 is to be paused or stopped, etc. In response to a determination that process 1100 is complete, process 1100 ends. In response to a determination that process 1100 is not complete, process 1100 returns to 1102.

Figure 12:
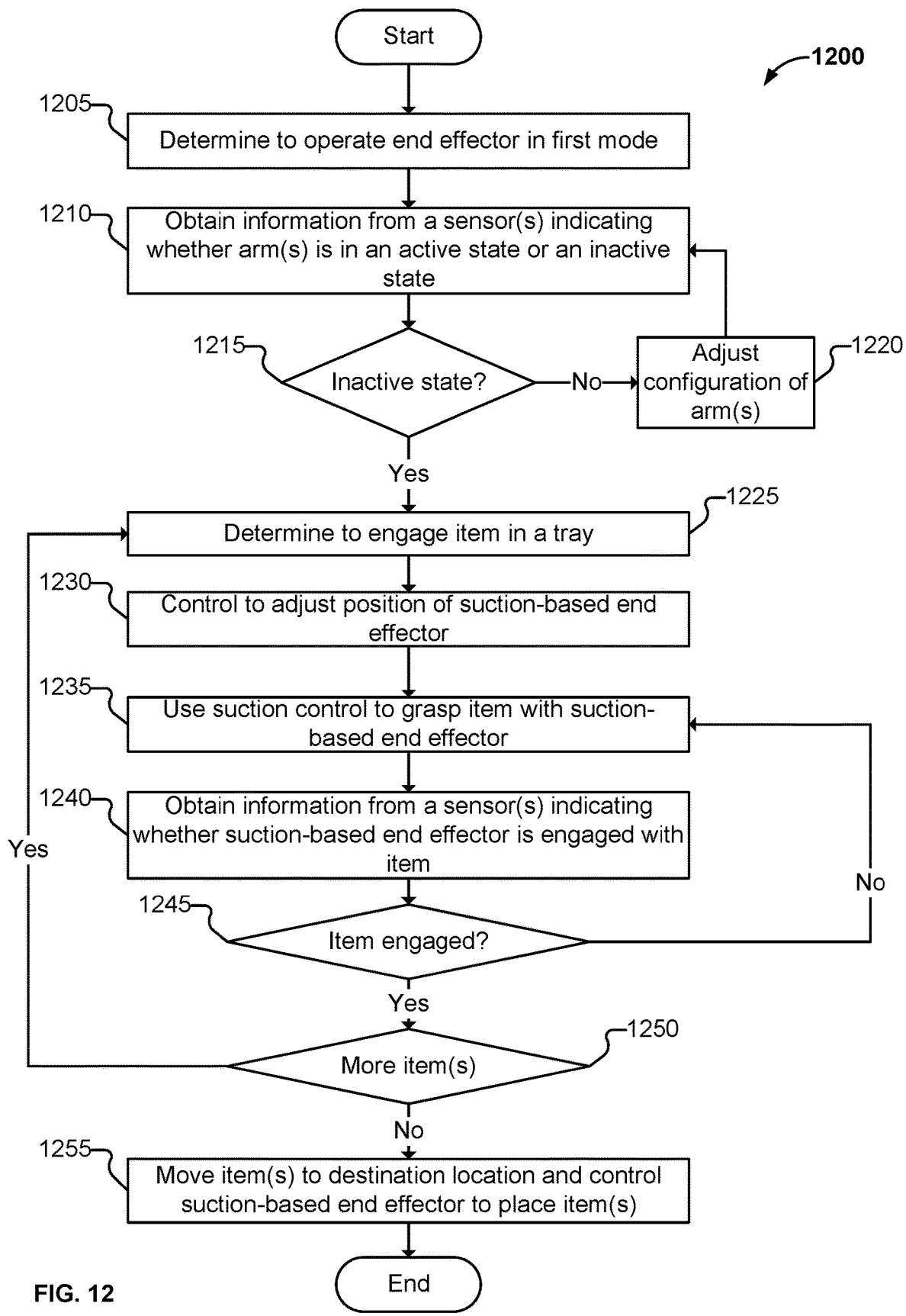
FIG. 12 is a flow diagram of a process for operating an end effector in connection with picking or placing an item to/from a tray according to various embodiments.

FIG. 12 is a flow diagram of a process for operating an end effector in connection with picking or placing an item to/from a tray according to various embodiments. In some embodiments, process 1200 is implemented in connection with controlling end effector 300 of FIGS. 3A-3B. In some embodiments, process 1200 is implemented by system 100 of FIG. 1A, etc.

At 1205, the system determines to operate the end effector in a first mode. In some embodiments, the system determines to operate the multi-mode end effector in the first mode in connection with determining that the object to be grasped is an item to be picked/placed from/to a tray, or otherwise determining that the object is to be grasped with a suction-based end effector.

At 1210, information is obtained from one or more sensors. The information indicates whether one or more of the gripper arms is in an active state or an inactive state (or some intermediate state between the inactive state or inactive state). In some embodiments, the system uses the information corresponding to a positioning of the gripper arms in connection with controlling the gripper arms (or second grasping mechanism) to transition to the active state or inactive state according to a mode in which the multi-mode end effector is to be operated.

At 1215, a determination is made as to whether the gripper arms are positioned in the inactive state. In response to determining that the gripper arms are not in the inactive state (or determining that the gripper arms are in the active state) at 1215, process 1200 proceeds to 1220 at which a configuration of the gripper arms is adjusted. Process 1200 iterates over 1210-1220 until the system determines that the gripper arms are in the inactive state. In response to determining that the gripper arms are in the inactive state at 1215, process 1200 proceeds to 1225.

At 1225, the system determines to engage an item in a tray or other receptacle (or from a source location). The system determines to engage an item based on a manifest (e.g., an order, a packing slip, etc.).

At 1230, the system controls to adjust a position of the suction-based end effector (e.g., the first grasping mechanism). in the inactive state. The system controls to position the suction-based end effector to engage the item to be grasped. For example, the system moves the robotic arm and end effector to a position at which a suction-cup on the suction-based end effector engages the item.

At 1235, the system uses suction control to grasp the item(s) with the suction-based end effector. The system actuates a suction mechanism to apply a suction force between one or more suction cups (e.g., comprised in the suction-based end effector) and the item(s) to be grasped. In some embodiments, the suction-based end effector is controlled to grasp a plurality of items (e.g., to simultaneously move the plurality of items to respective destination location).

At 1240, information is obtained from one or more sensors. The information indicates whether the suction-based end effector is engaged with the item(s) to be grasped. For example, the system obtains information pertaining to a suction force between the suction cup(s) of the suction-based end effector and the item(s) to be grasped.

At 1245, the system determines whether the item(s) is engaged. In response to determining that the item(s) is not securely grasped (e.g., a suction force between the item and the end effector is less than a threshold suction force, or that the item is not engaged with the item) at 1245, process 1200 returns to 1235 at which the system uses the suction control to adjust/secure engagement/grasping of the item using the suction-based end effector. Process 1200 iterates over 1235-1245 until the system determines that the item(s) is securely grasped by the suction-based end effector.

At 1250, a determination is made as to whether one or more other items are to be grasped by the suction-based end effector. For example, the system determines whether the suction-based end effector is to simultaneously move a plurality of items to respective destination locations. In response to determining that one or more other items are to be grasped by the suction-based end effector (e.g., for simultaneous movement/placement) at 1250, process 1200 returns to 1225 and process 1200 iterates over 1225-1250 until the system determines that no further items are to be grasped by the suction-based end effector. In response to determining that no further items are to be grasped by the suction-based end effector at 1250, process 1200 proceeds to 1255.

At 1255, the item(s) is moved to the destination location and the suction-based end effector is controlled to place the item(s). In some embodiments, the system controls a robotic arm to move the item to the destination location (or proximity of the destination location) and then controls the suction-based end effector to release the item at the destination location. For example, the system controls the suction-based end effector to reduce/eliminate the suction force between the suction-based end effector and the item(s).

Figure 13:
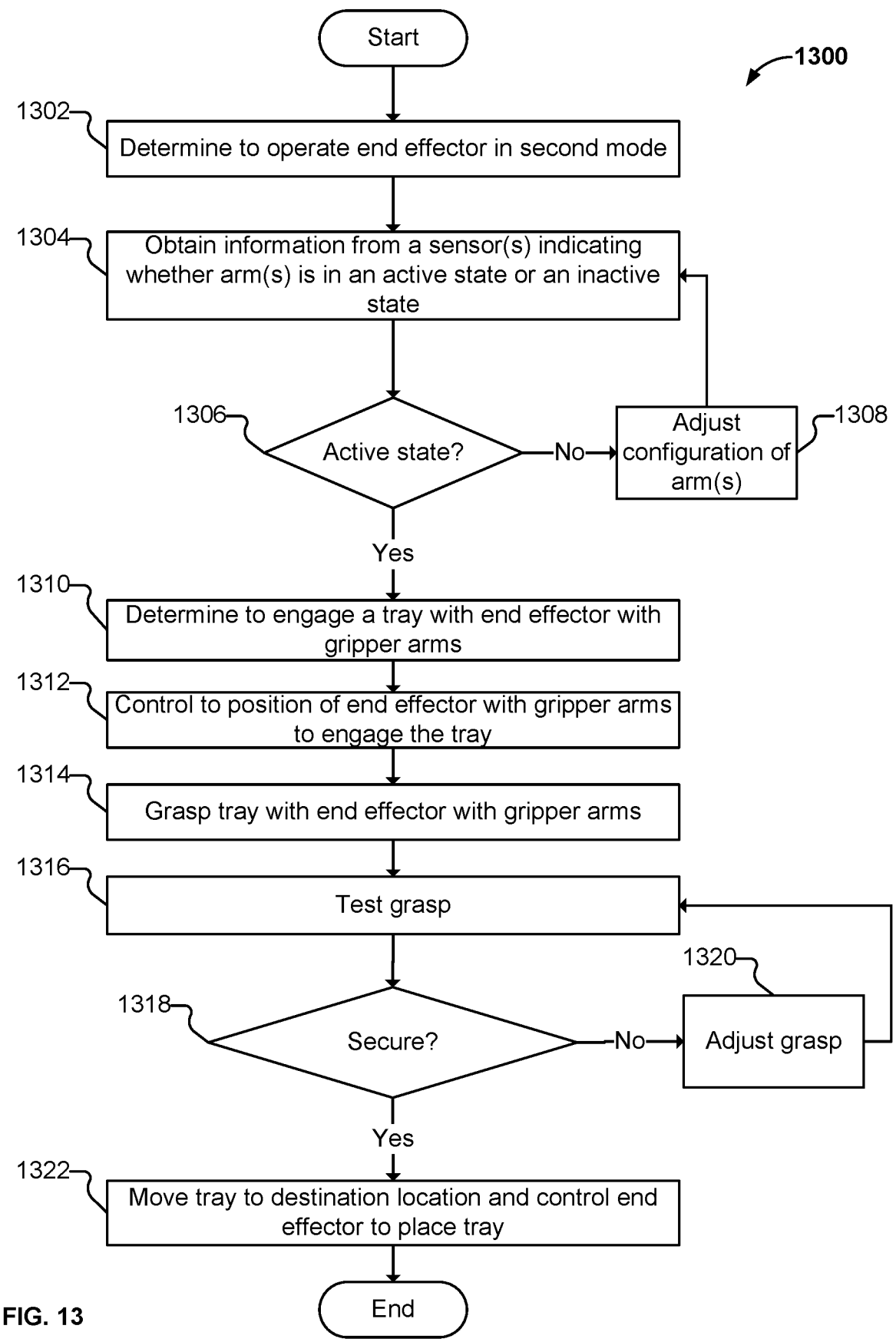
FIG. 13 is a flow diagram of a process for operating an end effector in connection with picking or placing a tray or other receptacle according to various embodiments.

FIG. 13 is a flow diagram of a process for operating an end effector in connection with picking or placing a tray or other receptacle according to various embodiments. In some embodiments, process 1300 is implemented in connection with controlling end effector 300 of FIGS. 3A-3B. In some embodiments, process 1300 is implemented by system 100 of FIG. 1A, etc.

At 1302, a determination is made to operate the end effector (e.g., a multi-mode end effector) in a second mode. In some embodiments, the system determines to operate the multi-mode end effector in the second mode in connection with determining that the object to be grasped is a tray that is to be picked and/or placed on a stack of trays, etc., or otherwise determining that the object is to be grasped with an end effector having gripper arms.

At 1304, information is obtained from one or more sensors. The information indicates whether one or more of the gripper arms is in an active state or an inactive state (or some intermediate state between the inactive state or inactive state). In some embodiments, the system uses the information corresponding to a positioning of the gripper arms in connection with controlling the gripper arms (or second grasping mechanism) to transition to the active state or inactive state according to a mode in which the multi-mode end effector is to be operated.

At 1306, a determination is made as to whether the gripper arms are positioned in the inactive state. In response to determining that the gripper arms are not in the active state (or determining that the gripper arms are in the inactive state) at 1306, process 1300 proceeds to 1308 at which a configuration of the gripper arms is adjusted. For example, the system controls to move (or continue to move) the gripper arms to the active state (e.g., to the deployed position). In some embodiments, the active state corresponds to the gripper arms are positioned in a threshold deployed state such as within a range of angles between the gripper arms and the lateral member (e.g., the gripper arms are deemed to be in an active state even if the gripper arms are not fully deployed but are within a threshold of deployment of the gripper arms). As an example, with reference to FIG. 3C, the threshold deployed state can correspond to a state according to which side members 304, 306 are within 30 degrees and −30 degrees relative to vector 316. As another example, with reference to FIG. 3C, the threshold deployed state can correspond to a state according to which side members 304, 306 are within 15 degrees and −15 degrees relative to vector 316. Process 1300 iterates over 1304-1308 until the system determines that the gripper arms are in the inactive state.

In response to determining that the gripper arms are in the inactive state at 1306, process 1300 proceeds to 1310 at which the system determines to engage the object (e.g., one or more trays) with the second grasping mechanism (e.g., the gripper arms).

At 1312, the system controls to adjust a position of the end effector having gripper arms (e.g., the second grasping mechanism). The system controls to position the end effector having gripper arms to engage the item to be grasped. For example, the system moves the robotic arm and end effector to a position at which the gripper arm(s) of the end effector engages the object (e.g., the tray).

At 1314, the system controls the end effector to grasp the tray(s) with the gripper arms (e.g., the end effector comprising gripper arms). The system actuates one or more of the gripper arms to apply a force between the gripper arm and the tray(s) to be grasped. In some embodiments, the end effector having gripper arms is controlled to grasp a plurality of trays (e.g., to simultaneously move the plurality of items to respective destination location). As an example, the system controls an active arm (e.g., active gripper arm that is movable with respect to the lateral member of the multi-mode end effector) to close and to use force control to slot a thumb of the active arm into a grasp hole of the tray(s).

At 1316, the system (e.g., the robot) tests its grasp of the tray(s), and if the grasp is determined at 1318 to be secure the robot moves the tray to its destination (e.g., process 1300 proceeds to 1322). If the grasp is determined at 1318 not to be secure, the grasp is adjusted at 1320 and tested again at 1316. For example, the robot sets the tray back down on the source stack, release the tray, and attempt a new grasp. Or, the robot sets the tray at least partly on the source stack and attempt to adjust its grip without fully releasing the tray, e.g., by using force control to try to slot the passive and/or active side thumbs, respectively, more fully into the tray.

At 1322, the tray(s) is moved to the destination location and the end effector is controlled to place the tray(s) (e.g., the gripper arm(s) are controlled to disengage/release the tray(s)). In some embodiments, the system controls a robotic arm to move the item to the destination location (or proximity of the destination location) and then controls the end effector to release the tray at the destination location.

Figure 14A:
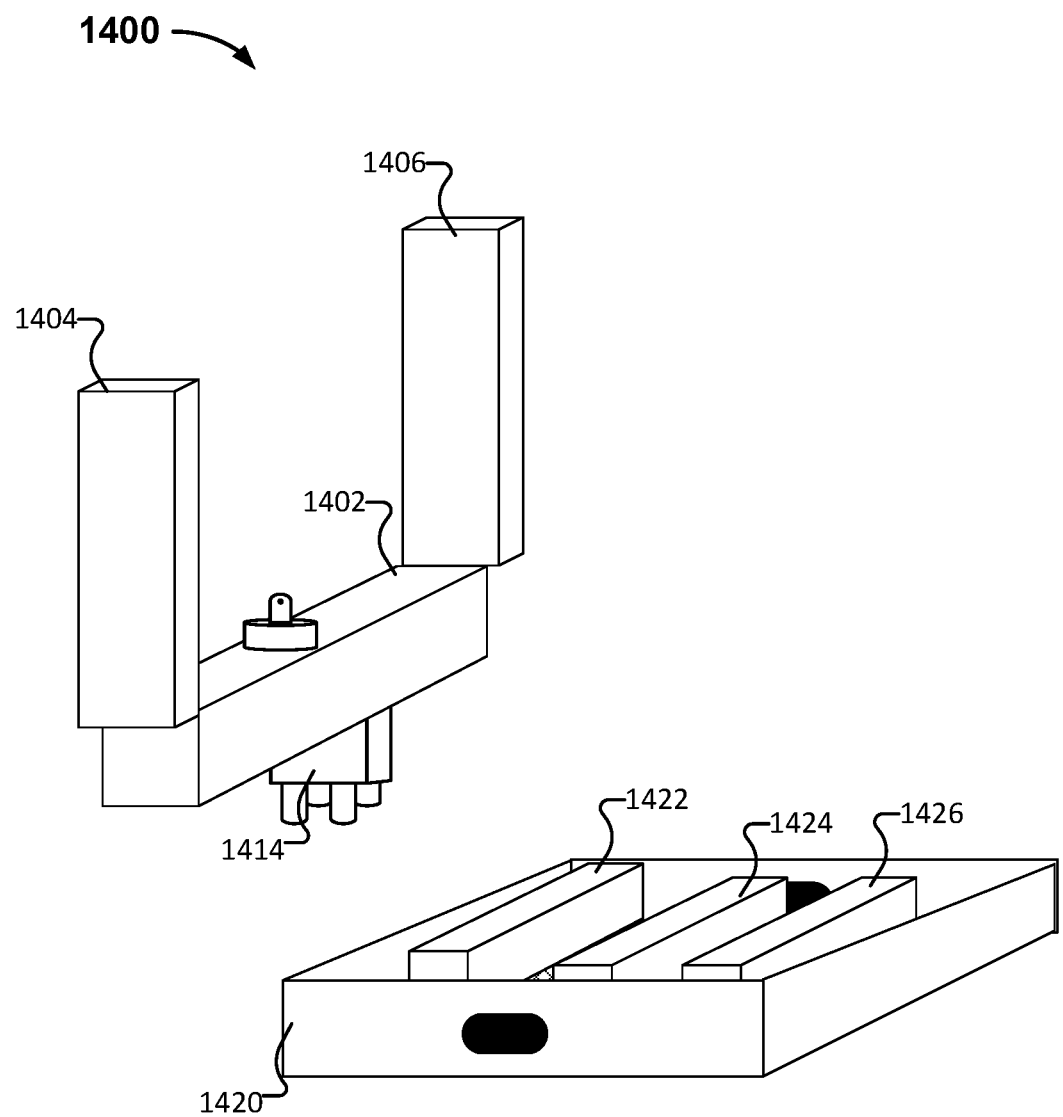
FIG. 14A is a diagram illustrating an end effector configured in a first mode according to various embodiments.

FIG. 14A is a diagram illustrating an end effector configured in a first mode according to various embodiments. In the example shown, multi-mode end effector 1400 is used to be used to pick an item from tray 1420. In response to determining to pick an item from tray 1420, the system determines to operate multi-mode end effector in a first mode according to which side members 1404 and 1406 are moved to an inactive state. Moving side members 1404 and 1406 to the inactive state includes moving side members a sufficient extent to expose suction-based end effector 1414 (e.g., to allow for suction-based end effector 1414 to engage/grasp the item). In the example shown, side members 1404 and 1406 are positioned in an inactive state (e.g., a retracted state) according to which side members 1404 and 1406 are opened about 180 degrees relative to a position at which side members 1404 and 1406 are in an active state. In various embodiments, side members 1404 and 1406 are opened greater than 180 degrees (e.g., such that side members 1404 and 1406 form an acute angle with respect to a top surface of lateral member 1402.

Figure 14B:
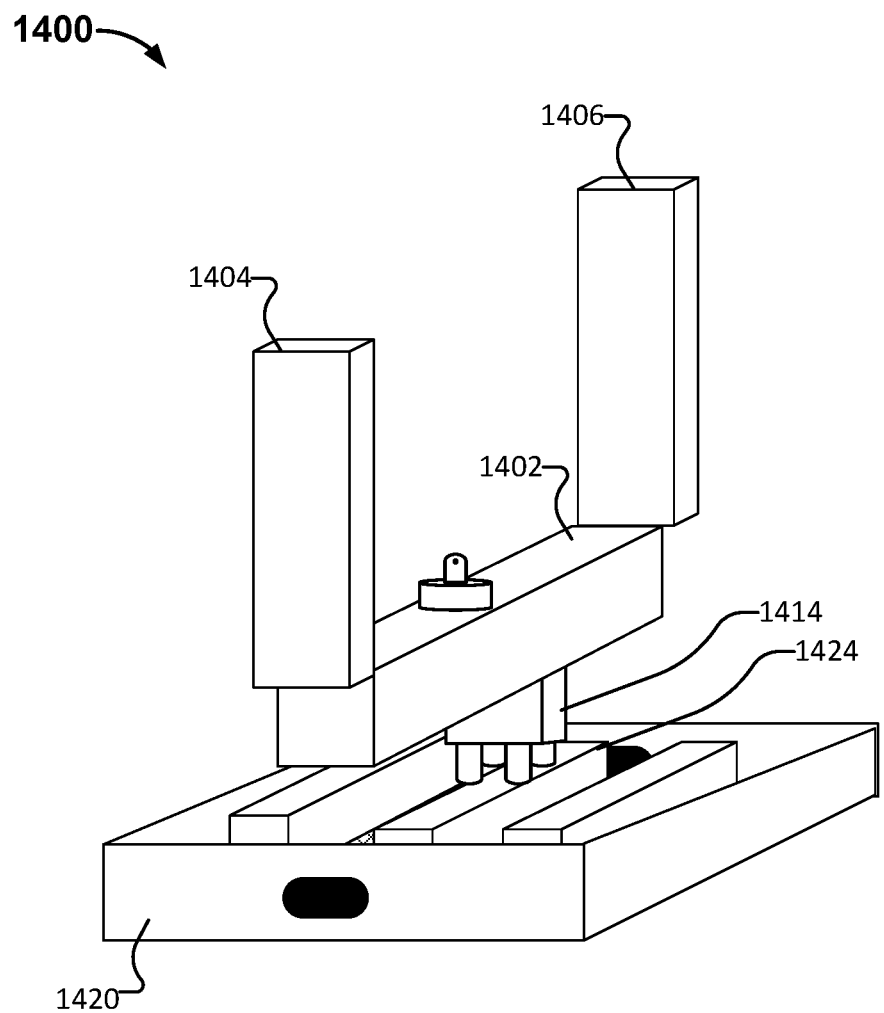
FIG. 14B is a diagram illustrating an end effector configured in a first mode according to various embodiments.

FIG. 14B is a diagram illustrating an end effector configured in a first mode according to various embodiments. In the example shown, multi-mode end effector 1400 is positioned within proximity of item 1424 (e.g., suction-based end effector 1414 is engaged with item 1424). The system robotically controls a robotic arm to which multi-mode end effector 1400 is mounted in order to move suction-based end effector 1414 to a source location for item 1424. The system robotically controls suction-based end effector 1414 to apply a suction force with item 1424. For example, the system actuates a suction control of suction-based end effector 1414 (or of multi-mode end effector 1400) to form a suction between at least one suction cup of suction-based end effector 1414 and item 1424. The system determines whether item 1424 is securely grasped before moving the robotic arm and/or multi-mode end effector 1400 to move item 1424.

Figure 14C:
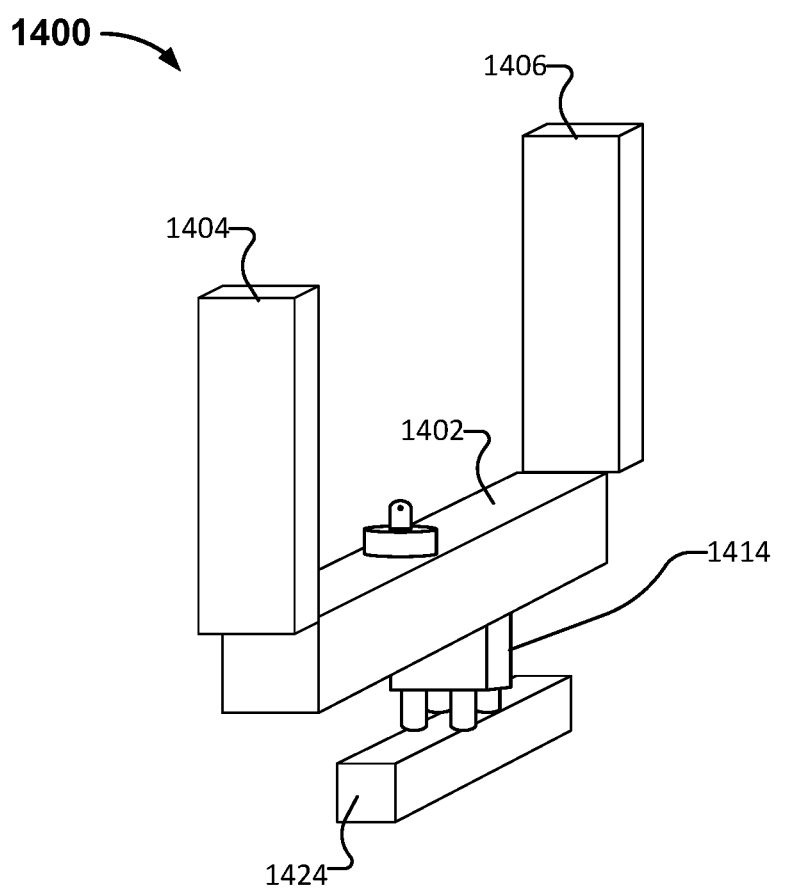
FIG. 14C is a diagram illustrating an end effector configured in a first mode according to various embodiments.
Figure 14C:
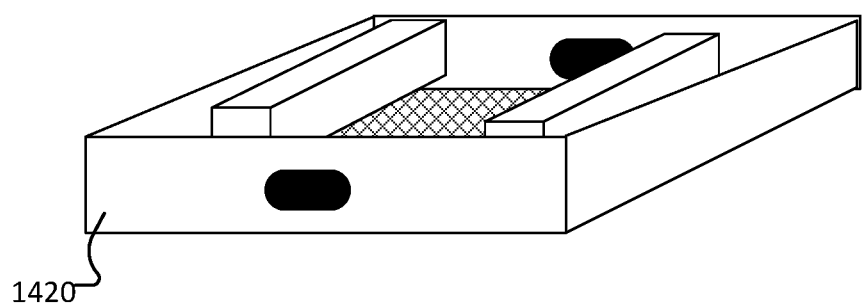

FIG. 14C is a diagram illustrating an end effector configured in a first mode according to various embodiments. In the example shown, multi-mode end effector has picked item 1424 from tray 1420. In some embodiments, in response to determining that suction-based end effector 1414 securely grasps item 1424, the system controls the robotic arm to move item 1424 to the corresponding destination location.

Figure 15:
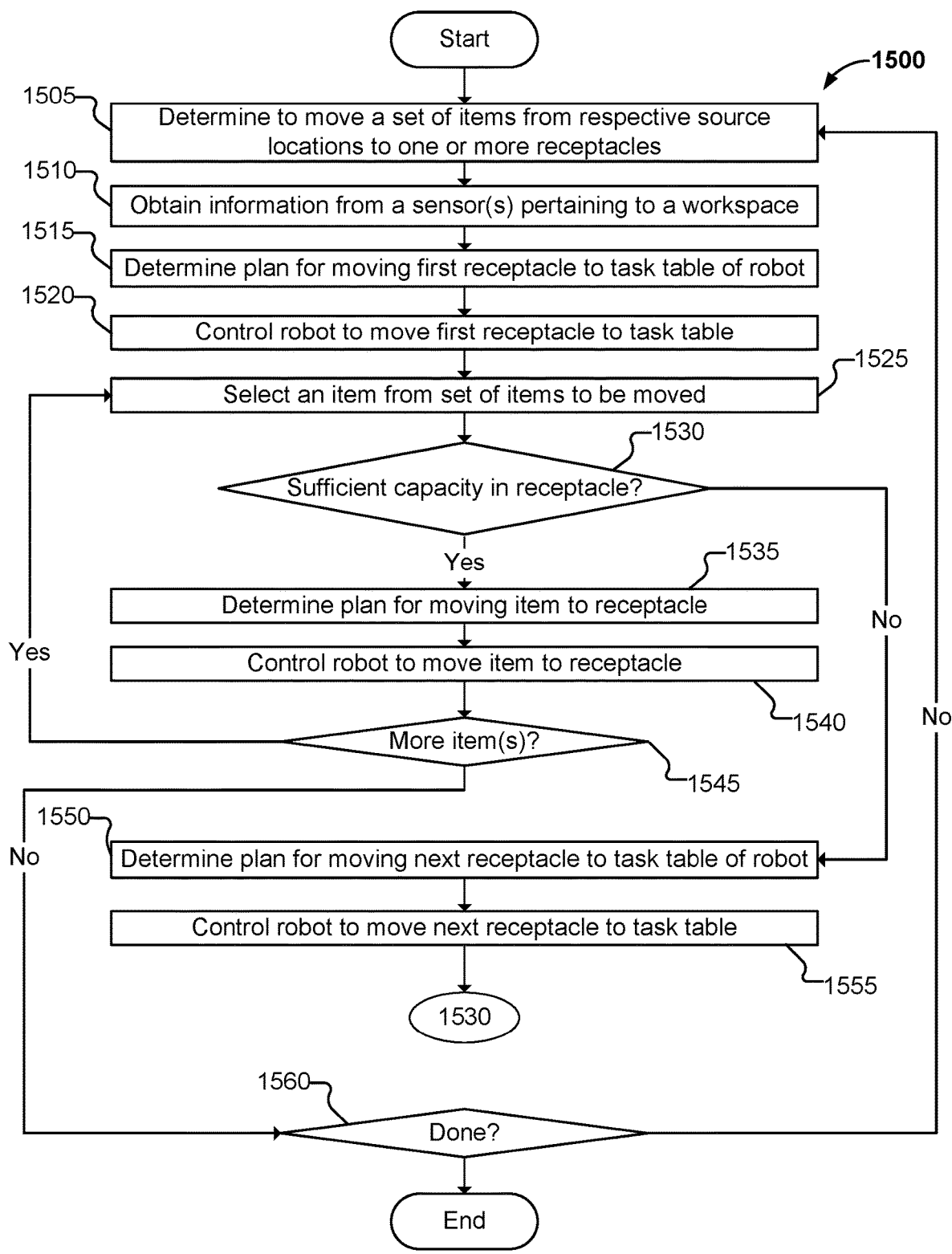
FIG. 15 is a flow diagram of a process for operating a robot to pick/place trays from/to a task table according to various embodiments.

FIG. 15 is a flow diagram of a process for operating a robot to pick/place trays from/to a task table according to various embodiments. In some embodiments, process 1500 is implemented in connection with controlling end effector 300 of FIGS. 3A-3B. In some embodiments, process 1500 is implemented by system 100 of FIG. 1A, etc.

At 1505, a determination is made to move a set of items from respective source locations to one or more receptacles. In some embodiments, the system determines to move the set of items from their respective source location to one or more receptacles in response to determining/obtaining a manifest or order to be processed. For example, the system determines the set of items based on a packing slip or invoice for the order and/or the system determines that the set of items are to be loaded into the one or more receptacles.

At 1510, information is obtained from one or more sensors pertaining to a workspace. In some embodiments, the system comprises one or more sensors within the workspace to obtain information pertaining to the workspace. For example, the system generates a model of the workspace and/or the tray(s) on the task table and items in the workspace based at least in part on the information obtained from the one or more sensors.

At 1515, a plan for moving a first receptacle to a task table of a robot is determined. The plan for moving the next receptacle to task table of the robot is based at least in part on a source location for the first receptacle (e.g., a stack of empty trays, etc.) and/or a location of the task table.

At 1520, the robot is controlled to move the first receptacle to the task table. In the case of that the robot comprises a multi-mode end effector, the system uses a receptacle grasping mechanism (e.g., uses gripper arms on the end effector) to pick the receptacle from the source location and to move the receptacle to the task table. The system then uses an item grasping mechanism (e.g., a suction-based end effector) of the multi-mode end effector to load the item(s) in the receptacle.

At 1525, an item is selected from the set of items to be moved to the one or more receptacles. The system iteratively selects an item(s) from the set of items to be moved and then operates to move the items in connection with loading the receptacle. In some embodiments, the system can select a plurality of items for simultaneous movement of the items to the receptacle (e.g., the system can use a first subset of suction cups on a suction-based end effector, and a second subset of suction cups to respectively grasp the items). In some embodiments, the system determines an overall plan/strategy for moving the set of items from their source locations to the one or more receptacles, such as determining an order in which the items are to be moved, or a general plan on a location at which the various items are to be placed. For example, if the set of items comprise items of different sizes/shapes, the system determines an optimized placement (e.g., location, orientation, order) of the set of items (or a subset of the items, such as in the case that a plurality of receptacles is to be loaded) and the item next to be moved is selected based on the overall plan or optimized placement.

At 1530, a determination is made as to whether the receptacle on the task table has sufficient capacity. In some embodiments, the system determines whether the receptacle in which the item is to be placed has sufficient capacity for the item to be placed therein. In some embodiments, the system determines whether the receptacle has sufficient capacity is based at least in part one or more of: (i) a number of items in the receptacle; (ii) an available space within the receptacle, (iii) a size of the next item, (iii) a weight of the receptacle, and (iv) a load on the task table. The system can use information obtained from one or more sensors within the workspace. For example, the sensor(s) includes a vision system. The vision system includes a camera directed to capture the task table of the robot. The system uses information from the vision system to obtain an image or model (e.g., generated based on information from the vision system) to determine an available space within the receptacle. As another example, the sensor(s) includes a weight sensor that detects a weight on the task table. The system uses the information from the weight sensor in connection with determining a weight of the receptacle (e.g., the receptacle and items therein) or otherwise to determine a load on the task table.

In response to determining that the receptacle has sufficient capacity at 1530, process 1500 proceeds to 1535 at which the system determines a plan for moving the item to the receptacle location. The plan is determined based at least in part on one or more of (i) a source location of the item, (ii) a location of the task table or receptacle, (iii) a workspace model generated based on information obtained from a vision system or one or more sensors in the workspace, (iv) a location of one or more obstacles within the workspace, (v) a cost function associated with computing the cost for a particular plan/trajectory of moving the item, (vi) one or more attributes pertaining to the item(s), etc. Various other factors may be used in connection with determining the plan.

At 1540, the robot is controlled to move the item to the receptacle. In some embodiments, the system uses the plan in connection with controlling the robot to move the item to the receptacle (e.g., to pick the item from the source location and place the item in the destination location in the receptacle).

At 1545, the system determines one or more other items of the set of items are to be moved. For example, the system determines whether the moving of the set of items is complete. As another example, the system determines whether additional items are to be moved based on a manifest for an order (e.g., an invoice, a packing slip, etc.).

In response to determining that one or more other items are to be moved at 1545, process 1500 returns to 1525 and process 1500 iterates over 1525-1545 and/or 1550 and 1555, as applicable. In response to determining that no further items of the set of items are to be moved at 1545, process 1500 proceeds to 1560.

In response to determining that the receptacle does not have sufficient capacity at 1530, process 1500 proceeds to 1550 at which the system determines a plan for moving a next receptacle to the task table of the robot. As an example, the system determines whether to move a next receptacle and place the next receptacle on the previous receptacle (e.g., the first receptacle). As another example, the system determines whether to move the existing/full receptacle from the task table, and to replace such receptacle with the next receptacle. The system determines whether to stack the next receptacle on the existing/previous tray or to replace the existing receptacle with the next receptacle (e.g., to remove the existing tray before placing the next tray on the task table) based at least in part on a weight of the existing receptacle(s) or load currently on the task table. The plan for moving the next receptacle to task table of the robot is based at least in part on a source location for the next receptacle (e.g., a stack of empty trays, etc.) and/or a location of the task table.

In response to determining the plan for moving the next receptacle to the task table, at 1555, the system controls the robot to move the next receptacle. In the case of that the robot comprises a multi-mode end effector, the system uses a receptacle grasping mechanism (e.g., uses gripper arms on the end effector) to pick the receptacle from the source location and to move the receptacle to the task table. The system then uses an item grasping mechanism (e.g., a suction-based end effector) of the multi-mode end effector to load the item(s) in the receptacle. In response to controlling the robot to move the next receptacle to the task table at 1555 (e.g., after determining that the next receptacle was successfully placed at the task table), process 1500 returns to 1530.

Although the example shown in FIG. 15 comprises the placement of items to one or more trays on a task table (e.g., loading the trays), various embodiments for unloading trays is similarly implemented. Trays are sequentially moved to the task table and unloaded, and upon completion of the unloading the trays, the empty trains are returned to a tray return location. For example, one or more trays comprising an item(s) are moved to the task table and the robot is controlled to unload the tray(s) (e.g., the robot picks an item from the tray on the task table and place the item at a destination location within the workspace, such as a conveyor, etc.).

Although the foregoing embodiments have been described in connection with the grasping, moving, and placing one or more trays, various other receptacles or containers may be implemented. Examples of other receptacles or containers include bags, boxes, pallets, crates, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by one or more processors, to move a set of items from respect source locations to one or more receptacles; and
   controlling a robotic arm to move the set of items to the one or more receptacles,
   controlling a robotic arm to pick a first receptacle from a receptacle source location to a task table that is mounted to the robotic arm or a carriage on which the robotic arm is mounted; and
   determining, for the set of items, a plan for pick a particular item from its respective source location and placing the particular item in the one or more receptacles, comprising:
   determining whether the first receptacle has sufficient capacity for a next item of the set of items;
   in response to determining that the first receptacle has sufficient capacity for the next item, determining a plan to pick the next item from a next item source location and placing the next item in the first receptacle; and
   in response to determining that the first receptacle does not have sufficient capacity for the next item, determining a plan to move the first receptacle to a receptacle return location;
   controlling the robotic arm to move the first receptacle to the receptacle return location;
   determining a plan to move a second receptacle to the task table;
   controlling the robotic arm to pick the second receptacle from the receptacle source location and place the second receptacle on the task table; and
   in response to determining that the second receptacle is placed on the task table, determining a plan to pick the next item from a next item source location and placing the next item in the second receptacle.

2. The method of claim 1, wherein a determination of whether the first receptacle has sufficient capacity is based at least in part one or more of: (i) a number of items in the first receptacle; (ii) an available space within the first receptacle, (iii) a size of the next item, and (iii) a weight of the first receptacle.

3. The method of claim 2, further comprising:
receiving information from one or more sensors within a workspace of the robotic arm;
determining a weight of the first receptacle based at least in part on the information; and
in response to determining that the weight of the first receptacle is greater than a predefined weight threshold, determining that the first receptacle does not have sufficient capacity for the next item.

4. A computer program product to control a robot, the computer program product being embodied in a non-transitory computer readable medium and comprising computer instructions for:
determining, by one or more processors, to move a set of items from respect source locations to one or more receptacles; and
controlling a robot to move the set of items to the one or more receptacles,
controlling a robotic arm to pick a first receptacle from a receptacle source location to a task table that is mounted to the robotic arm or a carriage on which the robotic arm is mounted; and
determining, for the set of items, a plan for pick a particular item from its respective source location and placing the particular item in the one or more receptacles, comprising:
determining whether the first receptacle has sufficient capacity for a next item of the set of items;
in response to determining that the first receptacle has sufficient capacity for the next item, determining a plan to pick the next item from a next item source location and placing the next item in the first receptacle; and
in response to determining that the first receptacle does not have sufficient capacity for the next item,
determining a plan to move the first receptacle to a receptacle return location;
controlling the robotic arm to move the first receptacle to the receptacle return location;
determining a plan to move a second receptacle to the task table;
controlling the robotic arm to pick the second receptacle from the receptacle source location and place the second receptacle on the task table; and
in response to determining that the second receptacle is placed on the task table, determining a plan to pick the next item from a next item source location and placing the next item in the second receptacle.

5. A robotic system, comprising:
a communication interface; and
one or more processors coupled to the communication interface and configured to:
determine to move a set of items from respect source locations to one or more receptacles;
receive, via the communication interface, data associated with a set of items; and
control a robotic arm to move the set of items to the one or more receptacles based at least in part on the data associated with the set of items, comprising:
control a robotic arm to pick a first receptacle from a receptacle source location to a task table that is mounted to the robotic arm or a carriage on which the robotic arm is mounted; and
determine, for the set of items, a plan for pick a particular item from its respective source location and placing the particular item in the one or more receptacles, comprising:
determine whether the first receptacle has sufficient capacity for a next item of the set of items;
in response to determining that the first receptacle has sufficient capacity for the next item, determine a plan to pick the next item from a next item source location and placing the next item in the first receptacle; and
in response to determining that the first receptacle does not have sufficient capacity for the next item,
determine a plan to move the first receptacle to a receptacle return location;
control the robotic arm to move the first receptacle to the receptacle return location;
determine a plan to move a second receptacle to the task table;
control the robotic arm to pick the second receptacle from the receptacle source location and place the second receptacle on the task table; and
in response to determining that the second receptacle is placed on the task table, determine a plan to pick the next item from a next item source location and placing the next item in the second receptacle.

* * * * *